US006553564B1

(12) United States Patent
Alexander, III et al.

(10) Patent No.: US 6,553,564 B1
(45) Date of Patent: Apr. 22, 2003

(54) PROCESS AND SYSTEM FOR MERGING TRACE DATA FOR PRIMARILY INTERPRETED METHODS

(75) Inventors: William Preston Alexander, III, Austin, TX (US); Robert Francis Berry, Austin, TX (US); Frank Eliot Levine, Austin, TX (US); Chester Charles John, Jr., Round Rock, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,439

(22) Filed: Jun. 30, 1999

Related U.S. Application Data

(63) Continuation-in-part of application No. 09/343,438, filed on Jun. 30, 1999, and a continuation-in-part of application No. 09/177,031, filed on Oct. 22, 1998, now Pat. No. 6,311,325, and a continuation-in-part of application No. 09/052,331, filed on Mar. 31, 1998, now Pat. No. 6,002,872, and a continuation-in-part of application No. 09/052,329, filed on Mar. 31, 1998, now Pat. No. 6,158,024, and a continuation-in-part of application No. 08/989,725, filed on Dec. 12, 1997, now Pat. No. 6,055,492.

(51) Int. Cl.[7] .................................... G06F 9/44
(52) U.S. Cl. ...................... 717/128; 717/124; 717/127; 717/129; 717/130
(58) Field of Search ............................ 717/4, 9, 128, 717/124, 127, 129, 130, 132, 133, 125; 711/154; 702/179; 714/37

(56) References Cited

U.S. PATENT DOCUMENTS

| | | | | |
|---|---|---|---|---|
| 5,802,585 A | * | 9/1998 | Scales et al. | 711/154 |
| 5,828,883 A | * | 10/1998 | Hall | 717/4 |
| 5,889,999 A | * | 3/1999 | Breternitz, Jr. et al. | 717/9 |
| 5,909,578 A | * | 6/1999 | Buzbee | 717/130 |
| 6,077,311 A | * | 6/2000 | Lichtenstein et al. | 717/128 |
| 6,158,024 A | | 12/2000 | Mandal | |
| 6,189,141 B1 | * | 2/2001 | Benitez et al. | 717/4 |
| 6,189,142 B1 | * | 2/2001 | Johnston et al. | 717/125 |

(List continued on next page.)

OTHER PUBLICATIONS

Title: Efficient Path Profiling, author: Ball et al, ACM, 1996.*

Title: Stack Trace Exceptions in Win32, author Carlo Pescio, Jun. 1998, Proquest.*

Title: Data strictire amd Insertion Algorithm for Representing Asynchronous occurrence for visualization by trace visualization tools using gnat charts with occurrence hierarchies, IBMTecbul Jul 1993.*

Hall et al.; Call Path Profiling Of Monotonic Program Resources in UNIX; Jun. 25, 1993; pp 1–13.

Ammous et al.; Exploring Hardware Performance Counters With Flow And Context Sensitive Profiling; pp 85–96.

Bell et al.; Optimally Profiling and Tracing Programs; Jul. 1994; pp 1319–1360.

*Primary Examiner*—Gregory Morse
*Assistant Examiner*—Chameli C. Das
(74) *Attorney, Agent, or Firm*—Duke W. Yee; Jeffrey S. LaBaw; Michael R. Nichols

(57) ABSTRACT

A process and system for profiling code executing on a data processing system is provided. Event-based trace data is recorded in response to selected events, and the event-based trace data includes an indication of which code is being interrupted. The trace data may be processed to identify a thread or method that was executing during the event. A periodically occurring event is also detected, and a stack associated with the profiled code is identified in response to detection of the periodically occurring event, such as a timer interrupt. The stack is examined to identify each routine that is currently executing during the periodically occurring event.

31 Claims, 22 Drawing Sheets

U.S. PATENT DOCUMENTS

| | | | | | |
|---|---|---|---|---|---|
| 6,202,199 | B1 | * | 3/2001 | Wygodny et al. | 717/4 |
| 6,226,787 | B1 | * | 5/2001 | Serra et al. | 717/4 |
| 6,247,170 | B1 | * | 6/2001 | Giroux | 717/131 |
| 6,263,491 | B1 | * | 7/2001 | Hunt | 717/4 |
| 6,282,701 | B1 | * | 8/2001 | Wygodny et al. | 717/4 |
| 6,295,644 | B1 | * | 9/2001 | Hsu et al. | 717/9 |

* cited by examiner

START UP AND LOADING OF CLASSES AND METHODS

UNLOADING OF CLASSES

| TIMESTAMP | EVENT | CALL STACK AFTER EVENT |
|---|---|---|
| 0 | ENTER C | C |
| 1 | ENTER A | CA |
| 2 | ENTER B | CAB |
| 3 | RETURN FROM B | CA |
| 4 | ENTER B | CAB |
| 5 | ENTER B | CABB |
| 6 | RETURN FROM B | CAB |
| 7 | RETURN FROM B | CA |
| 8 | RETURN FROM A | C |
| 9 | ENTER B | CB |
| 10 | ENTER A | CBA |
| 11 | ENTER B | CBAB |
| 12 | ENTER A | CBABA |
| 13 | RETURN FROM A | CBAB |
| 14 | RETURN FROM B | CBA |
| 15 | ENTER X | CBAX |
| 16 | RETURN FROM X | CBA |
| 17 | RETURN FROM A | CB |
| 18 | RETURN FROM B | C |
| 19 | RETURN FROM C | |

| SAMPLE | CALL STACK @ SAMPLE |
|---|---|
| 1 | C |
| 2 | CAB |
| 3 | CAB |
| 4 | CAB |
| 5 | C |
| 6 | CBA |
| 7 | CBABA |
| 8 | CBA |
| 9 | CBA |
| 10 | C |
FIG. 18B
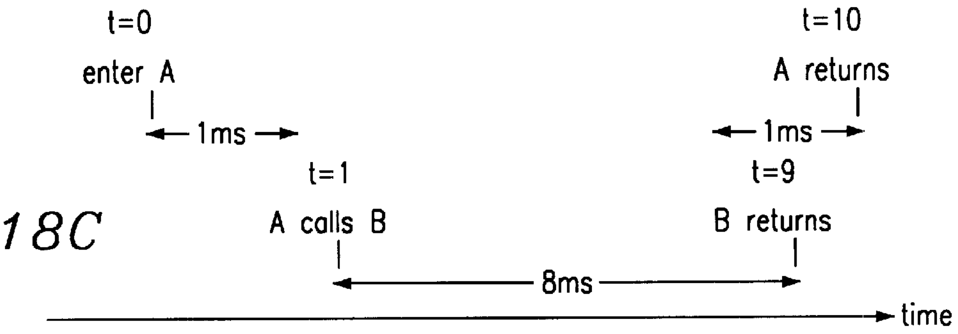
FIG. 18C
FIG. 18D
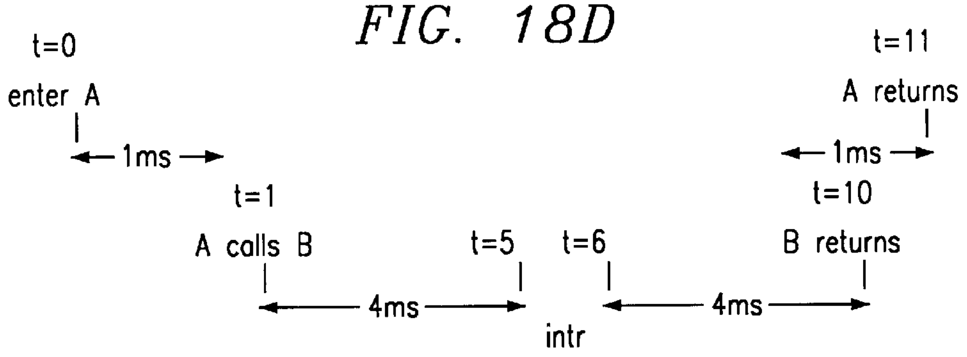

2030 2032 2034 2036 2038 2040

| LEVEL | RL | CALLS | BASE | CUM | INDENT |
|---|---|---|---|---|---|
| 0 | 1 | 1 | 0 | 19 | pt_pidtid |
| 1 | 1 | 1 | 3 | 19 | – C |
| 2 | 1 | 1 | 3 | 7 | – – A |
| 3 | 1 | 2 | 3 | 4 | – – – B |
| 4 | 2 | 1 | 1 | 1 | – – – – B |
| 2 | 1 | 1 | 2 | 9 | – – B |
| 3 | 1 | 1 | 3 | 7 | – – – A |
| 4 | 2 | 1 | 2 | 3 | – – – – B |
| 5 | 2 | 1 | 1 | 1 | – – – – – A |
| 4 | 1 | 1 | 1 | 1 | – – – – X |

| SAMPLE NO | CALL STACK |
|---|---|
| 1 | MAIN \| X() \| a() \| f3() |
| 2 | MAIN \| Y() \| a() \| f4() |
| 3 | MAIN \| X() \| b() \| a() \| f3() |
| 4 | MAIN \| X() \| Y() \| a() \| f0() |

| SAMPLE | CALLS | BASE | CUM | CUM 2 | NAME |
|---|---|---|---|---|---|
| 1 | 1 | 0 | 19 | 0 | pt_pit.tid |
| 2 | 1 | 3 | 19 | 0 | C |
| 3 | 3 | 7 | 14 | 15 | A |
| 4 | 5 | 8 | 13 | 17 | B |
| 5 | 1 | 1 | 1 | 2 | X |

ArcFlow Output
Base – Time/Instructions directly in function
Cum – Time/Instructions directly & indirectly in function ArcFlow Invarients:
1) Sum(Parent(Calls)) = Self(Calls)
2) Sum(Parent(Base)) = Self(Base)
3) Sum(Parent(Cum)) = Self(Cum)
4) Sum(Child(Cum)) = Self(Cum) – Self(Base)

| Source | Calls | Base | Cum | Function |
|---|---|---|---|---|
| Self | 1 | 0 | 19 | [0] pt_pidtid |
| Child | 1 | 3 | 19 | C |
| Parent | 1 | 3 | 19 | pt_pidtid |
| Self | 1 | 3 | 19 | [1] C |
| Child | 1 | 2 | 9 | B |
| Child | 1 | 3 | 7 | A |
| Parent | 1 | 3 | 7 | C |
| Parent | 1 | 3 | 7 | B |
| rParent | 1 | 1 | 1 | B |
| Self | 3 | 7 | 14<br>15 | [2] A |
| Child | 3 | 5 | 7 | B |
| Child | 1 | 1 | 1 | X |
| Parent | 2 | 3 | 4 | A |
| rParent | 1 | 2 | 3 | A |
| Parent | 1 | 2 | 9 | C |
| Self | 5 | 8 | 13<br>17 | [3] B |
| Child | 1 | 3 | 7 | A |
| rChild | 1 | 1 | 1 | A |
| Child | 1 | 1 | 1 | B |
| Parent | 1 | 1 | 1 | A |
| Self | 1 | 1 | 1 | [4] X |

Units : : Ticks
Total : : 342

| LvL | RL | Calls | Base | Cum | Indent Name |
|---|---|---|---|---|---|
| 1 | 1 | 1 | 0 | 342 | - _Thread-21_(0xe0046618) |
| 2 | 1 | 3 | 0 | 342 | -- J:nulltestScore() I |
| 3 | 1 | 2 | 0 | 272 | --- J:nulltestMilliseconds(I) I |
| 4 | 1 | 29450 | 0 | 271 | ---- J:nullexecute() I |
| 5 | 1 | 271 | 0 | 271 | ----+ stack_0x40 ~ 2902 |
| 6 | 1 | 271 | 0 | 271 | ----+- F:ExecuteJava |
| 7 | 1 | 271 | 0 | 271 | ----+-- F:jit_invokeCompiledEntryMethod |
| 8 | 1 | 271 | 0 | 271 | ----+--- F:_jit_invokeentry |
| 9 | 1 | 271 | 0 | 271 | ----+---- F:JITInvokeCompiledEntryMethod_md |
| 10 | 1 | 271 | 0 | 271 | ----+----+ J:nullrun() V |
| 11 | 2 | 271 | 0 | 271 | ----+----+- J:nulltestScore() I |
| 12 | 2 | 271 | 0 | 271 | ----+----+-- J:nulltestMilliseconds(I) I |
| 13 | 2 | 271 | 268 | 271 | ----+----+--- J:nullexecute() I |
| 14 | 1 | 2 | 0 | 2 | ----+----+---- F:jperf_methodEntry |
| 15 | 1 | 2 | 0 | 2 | ----+----+----+ F:SoftTracehook |
| 16 | 1 | 2 | 2 | 2 | ----+----+----+- F:enable_interrupts |
| 14 | 1 | 1 | 1 | 1 | ----+----+---- F:jperf_methodExit |
| 4 | 1 | 1 | 0 | 1 | ---- stack_0x40 ~ 2904 |
| 5 | 1 | 1 | 0 | 1 | ----+ F:ExecuteJava |
| 6 | 1 | 1 | 0 | 1 | ----+- F:jit_invokeCompiledEntryMethod |
| 7 | 1 | 1 | 0 | 1 | ----+-- F:_jit_invokeentry |
| 8 | 1 | 1 | 0 | 1 | ----+--- F:JITInvokeCompiledEntryMethod_md |
| 9 | 1 | 1 | 0 | 1 | ----+---- J:nullrun() V |
| 10 | 2 | 1 | 0 | 1 | ----+----+ J:nulltestScore() I |
| 11 | 2 | 1 | 0 | 1 | ----+----+- J:nulltestMilliseconds(I) I |
| 12 | 1 | 1 | 0 | 1 | ----+----+-- J:nullexecute() I |
| 13 | 1 | 1 | 0 | 1 | ----+----+--- F:jperf_methodExit |
| 14 | 1 | 1 | 0 | 1 | ----+----+---- F:SoftTracehook |
| 15 | 1 | 1 | 1 | 1 | ----+----+----+ F:enable_interrupts |
| 4 | 1 | 2 | 0 | 0 | ---- J:nullcleanUp () I |

2906 (rows 6–16 after stack_0x40 2902)

2908 (rows 5–15 after stack_0x40 2904)

*FIG. 29*

| MAJOR CODE | MINOR CODE | DATA ITEM 1 | DATA ITEM 2 | DATA ITEM 3 | DATA ITEM 4 | DATA ITEM 5 | DESCRIPTION |
|---|---|---|---|---|---|---|---|
| 0x4 | LEVEL + 0x1 | DEPTH | N/A | N/A | N/A | | BEGIN INTERRUPT AT LEVEL |
| 0x4 | LEVEL + 0x80000001 | DEPTH | N/A | N/A | N/A | | END INTERRUPT AT LEVEL |
| 0x10 | 0xAB | SYSTEM TID | JAVA TID | IS SYSTEM THREAD (BOOLEAN) | N/A | | THREAD CREATED WITHOUT A NAME WHILE TRACE ACTIVE |
| 0x10 | 0xAC | SYSTEM TID | N/A | N/A | N/A | | IDENTIFIES THE IDLE THREAD |
| 0x10 | 0xAD | SYSTEM TID | N/A | N/A | N/A | | IDENTIFIES THE GARBAGE COLLECTION THREAD |
| 0x10 | 0xAE | SYSTEM TID | JAVA TID | THREAD NAME | N/A | | THREAD CREATED WITH A NAME WHILE TRACE ACTIVE |
| 0x30 | 0x10 | OBJECT ID | METHOD BLOCK ADDRESS | N/A | N/A | | METHOD INVOCATION (INTERPRETED) |
| 0x30 | 0x10 + 0x80000000 | OBJECT ID | METHOD BLOCK ADDRESS | N/A | N/A | | METHOD EXIT (INTERPRETED) |
| 0x40 | 0x7fffffff | NUMBER (N) OF STACK UNWINDS AT TIMER INTERRUPT | PC1-PROGRAM COUNTER OF INTERRUPTED ROUTINE | PC2-CALLER OF INTERRUPTED ROUTINE | . . . | PCN-1 OF N-2ND CALLER OF INTERRUPTED ROUTINE | PCN OF N-1ST CALLER OF INTERRUPTED ROUTINE |
| 0x41 | 0x7fffffff | NUMBER (N) OF STACK UNWINDS AT INSTRUMENTED ROUTINE | PC1-PROGRAM COUNTER OF INSTRUMENTED ROUTINE | PC2-CALLER OF INSTRUMENTED ROUTINE | . . . | | PCN OF N-1ST CALLER OF INSTRUMENTED ROUTINE |
| 0x50 | 0x10 | OBJECT ID | METHOD BLOCK ADDRESS | N/A | N/A | | METHOD INVOCATION (JITTED) |
| 0x50 | 0x10 + 0x80000000 | OBJECT ID | METHOD BLOCK ADDRESS | N/A | N/A | | METHOD EXIT (JITTED) |

FIG. 30

FIG. 31B
```
;; at this point, register r3 = ray.getOrigin()
;; next do r3.getX();
load     r2 = [r3]                  ; get method table of ray.getOrigin()
load     r2 = [r2 + offset_getX]    ; get method block of getX()
```
FIG. 31C
```
;; at this point, register r3 = ray.getOrigin()
;; next do r3.getX();
int3 interrupt
load     r2 = [r2 + offset_getX]    ; get method block of getX()
```
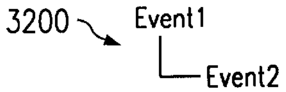
FIG. 32A
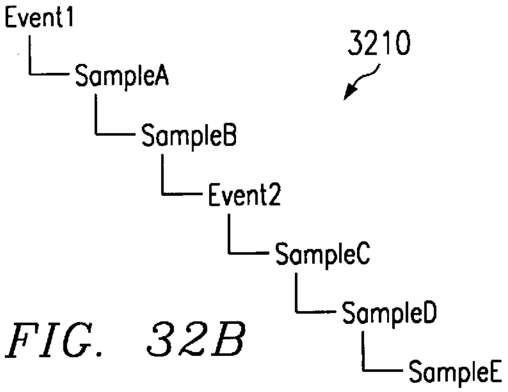
FIG. 32B
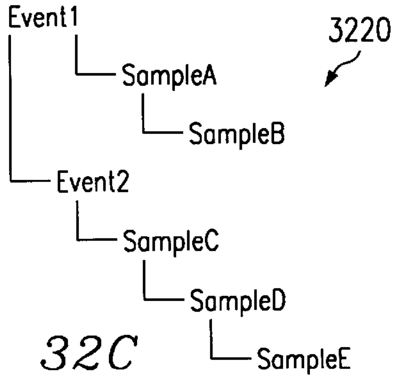
FIG. 32C
FIG. 33
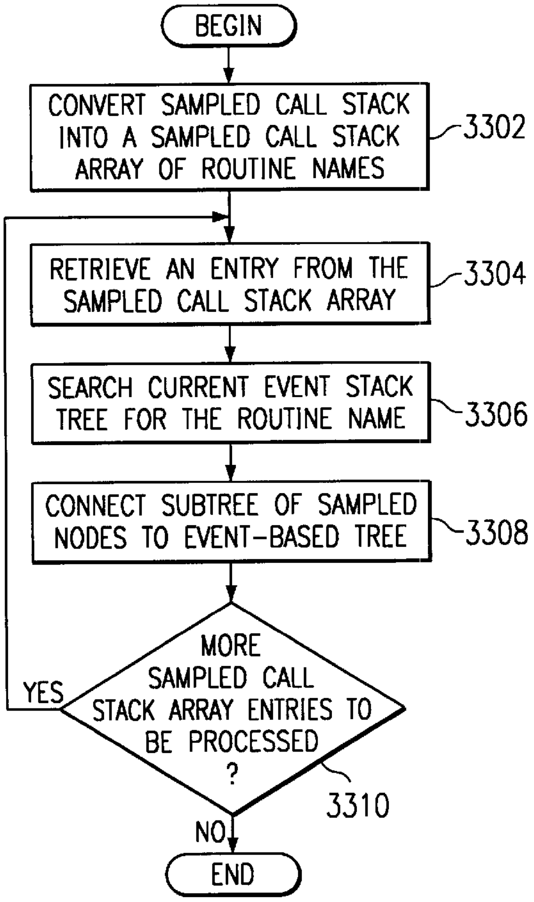

PROCESS AND SYSTEM FOR MERGING TRACE DATA FOR PRIMARILY INTERPRETED METHODS

CROSS REFERENCE TO RELATED APPLICATION

This application is a continuation-in-part of the following copending and commonly assigned applications entitled "SYSTEM AND METHOD FOR PROVIDING TRACE INFORMATION REDUCTION", U.S. application Ser. No. 08/989,725, filed on Dec. 12, 1997, now U.S. Pat. No. 6,055,492, "A METHOD AND APPARATUS FOR STRUCTURED PROFILING OF DATA PROCESSING SYSTEMS AND APPLICATIONS", U.S. application Ser. No. 09/052,329, filed on Mar. 31, 1998, now U.S. Pat. No. 6,002,872, "METHOD AND APPARATUS FOR PROFILING PROCESSES IN A DATA PROCESSING SYSTEM", U.S. application Ser. No. 09/177,031, filed on Oct. 22, 1998, now U.S. Pat. No. 6,311,325, and "METHOD AND SYSTEM FOR MERGING EVENT-BASED DATA AND SAMPLED DATA INTO POSTPROCESSED TRACE OUTPUT", U.S. application Ser. No. 09/343,438, currently pending, filed Jun. 30, 1999.

Additionally, this application is related to U.S. patent application Ser. No. 09/052,331, filed Mar. 31, 1998,which issued as U.S. Pat. No. 6,158,024 and is hereby incorporated by reference.

BACKGROUND OF THE INVENTION

1. Technical Field

The present invention relates to an improved data processing system and, in particular, to a method and apparatus for optimizing performance in a data processing system. Still more particularly, the present invention provides a method and apparatus for a software program development tool for enhancing performance of a software program through software profiling.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool, which keeps track of particular sequences of instructions by logging certain events as they occur, so-called event-based profiling. For example, a trace tool may log every entry into, and every exit from, a module, subroutine, method, function, or system component. Alternately, a trace tool may log the requester and the amounts of memory allocated for each memory allocation request. Typically, a time stamped record is produced for each such event. Pairs of records similar to entry-exit records also are used to trace execution of arbitrary code segments, to record requesting and releasing locks, starting and completing I/O or data transmission, and for many other events of interest.

Another tool used involves program sampling to identify certain locations in programs in which the programs appear to spend large amounts of time, such as program hot spots. This technique is based on the idea of interrupting the application or data processing system execution at regular intervals, so-called sample-based profiling. In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas which might benefit most from improvements to the code. At each interruption, the program counter of the currently executing thread, a process that is part of a larger process or program, is recorded. Typically, at post-processing time, these tools capture values that are resolved against a load map and symbol table information for the data processing system, and a profile of where the time is being spent is obtained from this analysis.

For example, isolating such hot spots to the instruction level permits compiler writers to find significant areas of suboptimal code generation, at which they may thus focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

Event-based profiling has limitations. For example, event-base profiling is expensive in terms of performance (an event per entry and per exit), which can and often does perturb the resulting view of performance. Additionally, this technique is not always available because it requires the static or dynamic insertion of entry/exit events into the code. This insertion of events is sometimes not possible or is often difficult. For example, if source code is unavailable for the to-be-instrument code, event-based profiling may not be feasible. However, it is possible to instrument an interpreter of the source code to obtain event-base profiling information without changing the source code.

On the other hand, sample-base profiling provides only a "flat view" of system performance but does provide the benefits of reduced cost and reduced dependence on hooking-capability.

Further, sample-based techniques do not identify where the time is spent in many small and seemingly unrelated functions or in situations in which no clear hot spot is apparent. Without an understanding of the program structure, it is not clear with a "flat" profile how to determine where the performance improvements can be obtained.

Therefore, it would be advantageous to provide both event-based and sample-based profiling of an application within the same time period. It would be particularly advantageous to provide the ability to enable and disable profiling of selected portions of a data processing system and to combine the output from different types of profiling into a single merged presentation.

SUMMARY OF THE INVENTION

The present invention provides a process and system for profiling code executing on a data processing system. Event-based trace data is recorded in response to selected events, and the event-based trace data includes an indication of which code is being interrupted. The trace data may be processed to identify a thread or method that was executing during the event. A periodically occurring event is also detected, and a stack associated with the profiled code is identified in response to detection of the periodically occurring event, such as a timer interrupt. The stack is examined to identify each routine that is currently executing during the periodically occurring event.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 18B depicts a particular timer based sampling of the execution flow depicted in FIG. 18A;

FIGS. 18C–D are time charts providing an example of the types of time for which the profiling tool accounts;

FIG. 20 is a table depicting a call stack tree;

FIG. 25 is a diagram depicting a structured profile obtained using the processes of the present invention;

FIG. 26 is a diagram depicting a record generated using the processes of present invention;

FIG. 27 is a diagram depicting another type of report that may be produced to show the calling structure between routines shown in FIG. 20;

FIG. 29 is a table depicting a report generated from a trace file containing both event-based profiling information (method entry/exits) and sample-based profiling information (stack unwinds);

FIG. 30 is a table depicting major codes and minor codes that may be employed to instrument modules for profiling;

FIGS. 31B–C are examples of pseudo-assembly language code that depict the changes required for inserting profile hooks into specific routines in real-time by updating the code for a software interrupt;

FIGS. 32A–32C depict a series of tree structures generated from events and stack unwinds; and FIG. 33 is a flowchart depicting a method by which a tree containing merged sample data and event data is constructed.

DETAILED DESCRIPTION OF A PREFERRED EMBODIMENT

Figure 1:
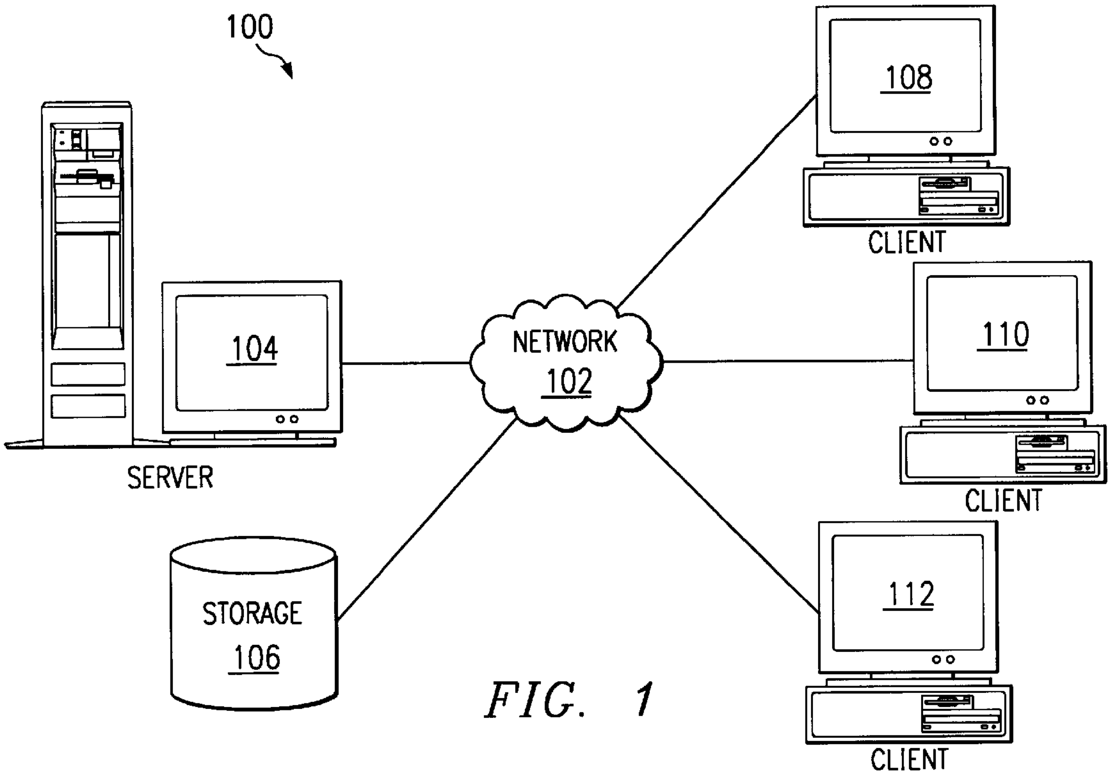
FIG. 1 depicts a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients

108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

Figure 2A:
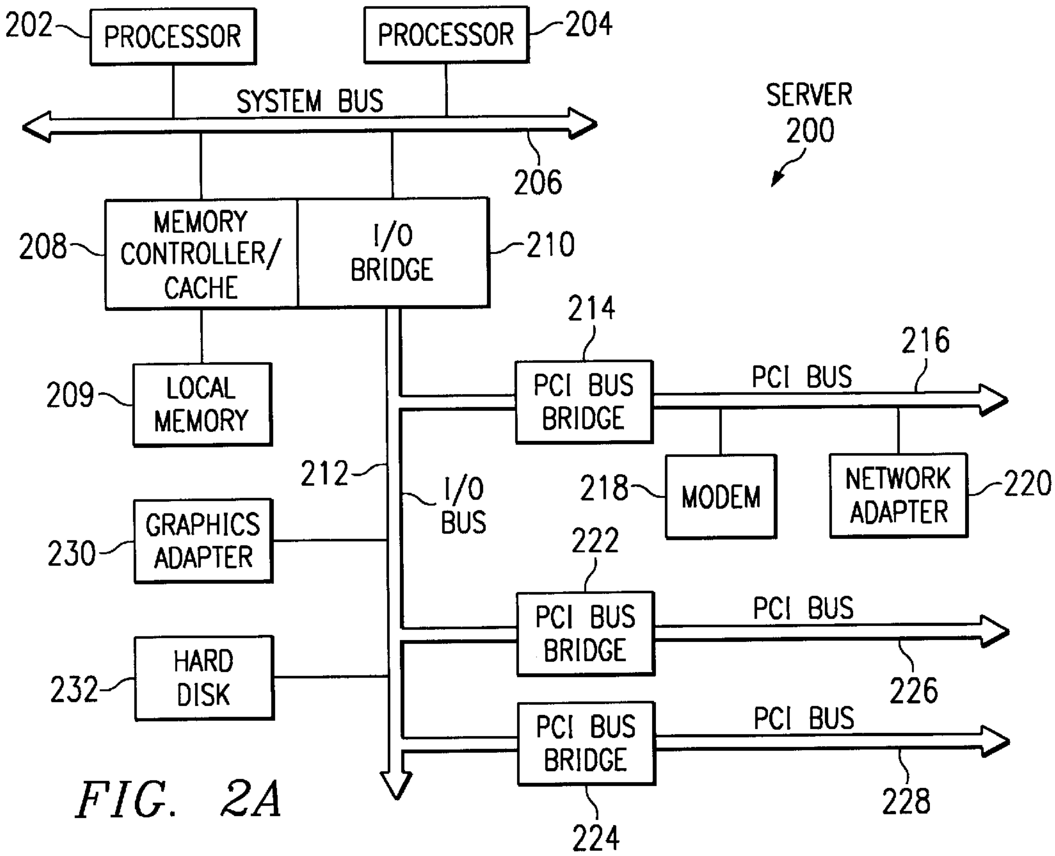
FIGS. 2A–B are block diagrams depicting a data processing systems in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, New York, running the Advanced Interactive Executive (AIX) operating system.

Figure 2B:
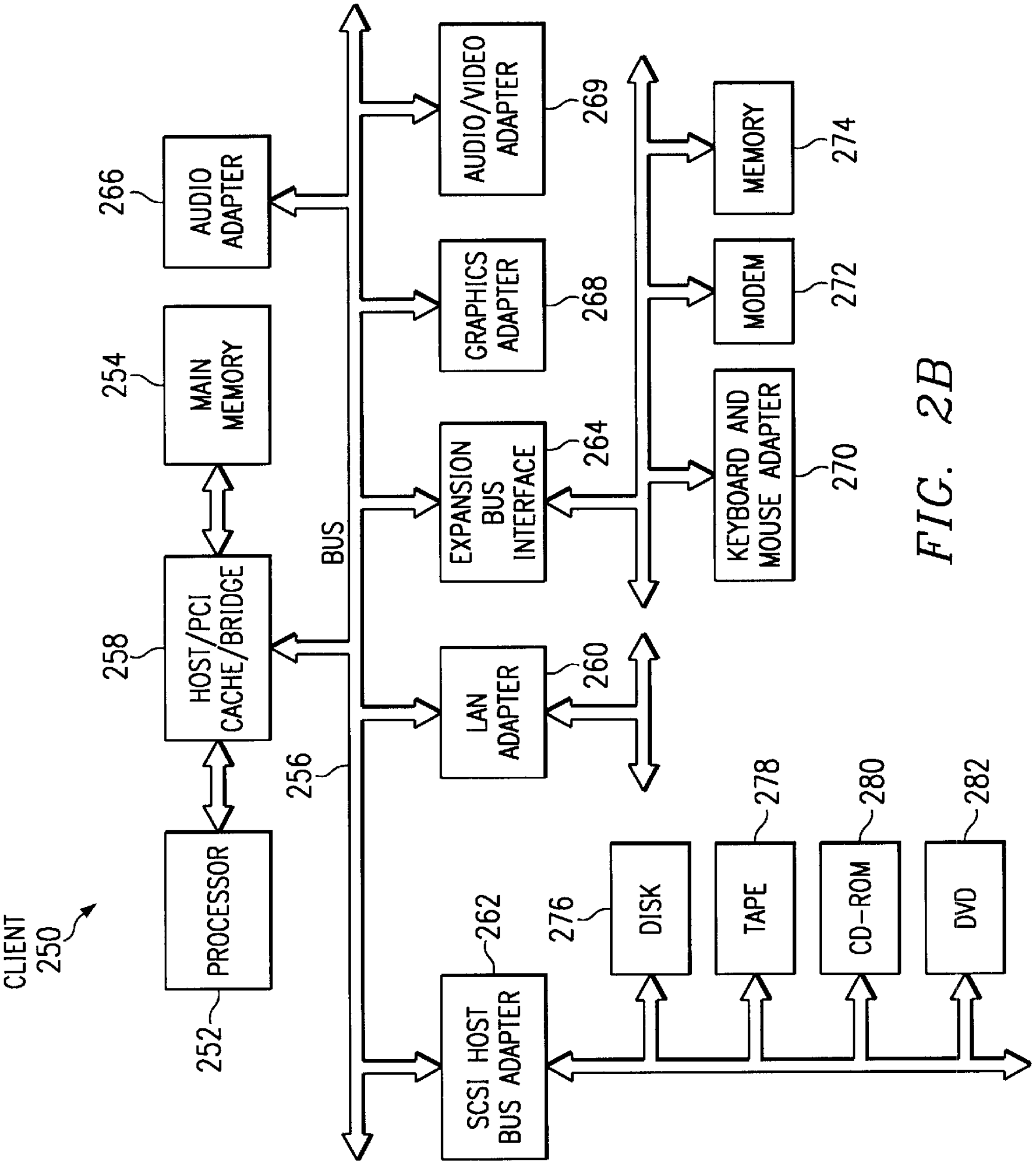

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business™ or OS/2™, which are available from International Business Machines Corporation™. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and provides calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Often times, hard disk drives are absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for profiling software applications. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

Figure 3A:
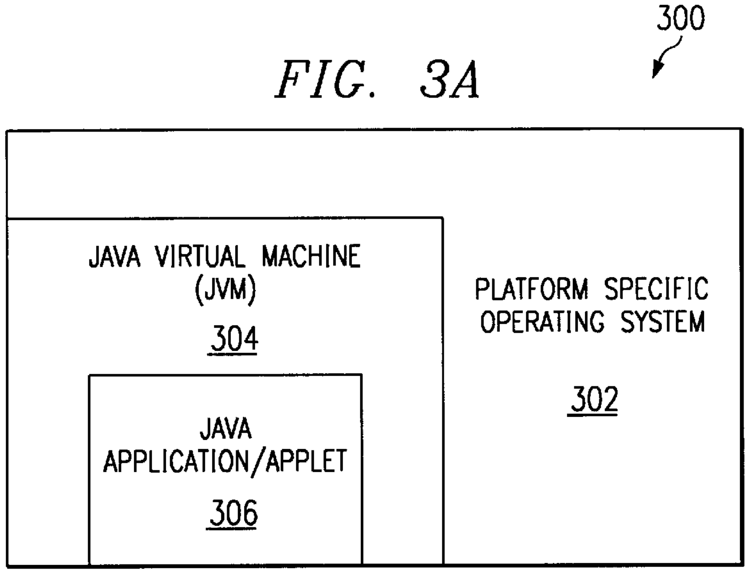
FIG. 3A is a block diagram depicting the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes are may be translated into native code by a just-in-time compiler or JIT.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method or determination are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code. Profile instrumentation is discussed in more detail further below.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
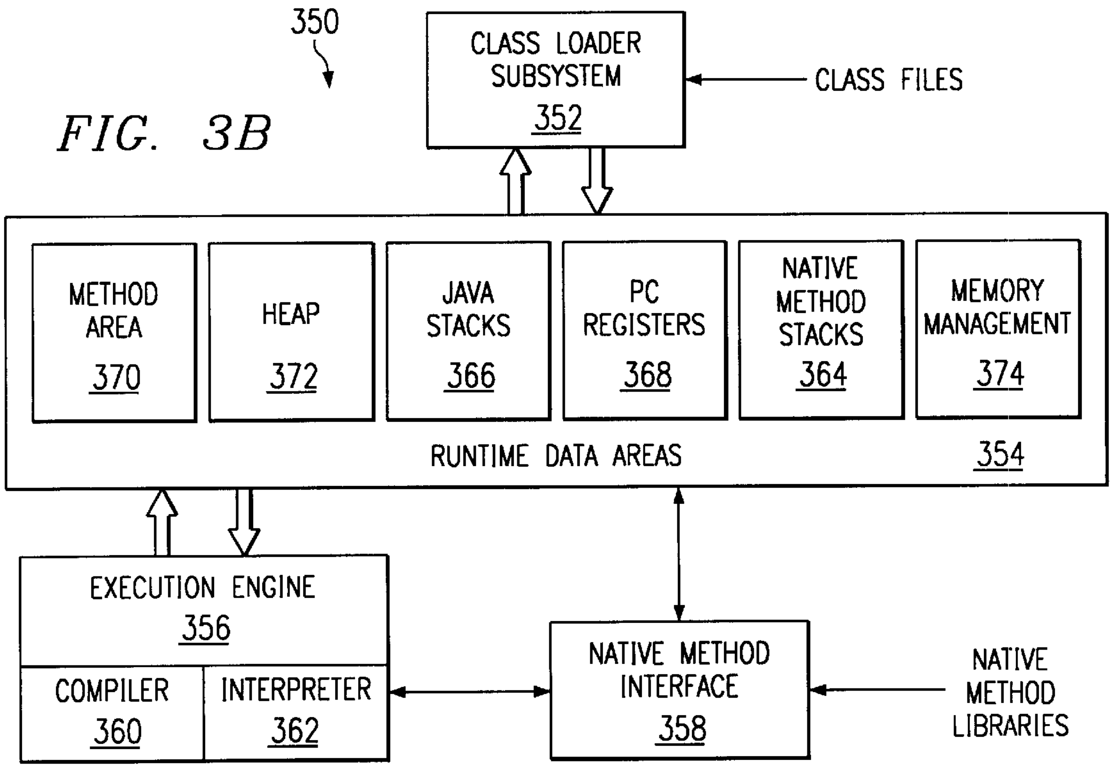
FIG. 3B is a block diagram depicting a Java virtual machine in accordance with a preferred embodiment of the present invention.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by JVM 350 to execute a program.

Java stacks 366 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java stacks 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory. Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

The present invention provides both event-based profiling and sample-based profiling of an application within the same time period, as described in more detail further below. The processes within the figures may be categorized in an attempt to gain an overall perspective of the many processes employed within the present invention: processes that generate event-based profiling information in the form of specific types of records in a trace file; processes that generate sample-based profiling information in the form of specific types of records in a trace file; processes that read the trace records to generate more useful information to be placed into profile reports; and processes that generate the profile reports for the user of the profiling utility.

Figure 4:
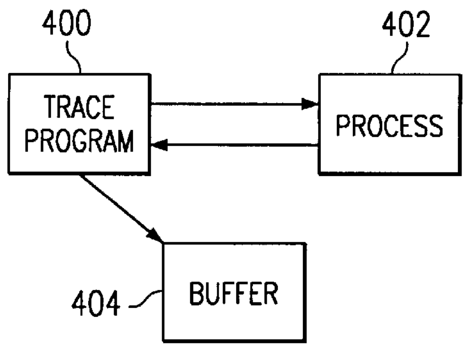
FIG. 4 is a block diagram depicting components used to profile processes in a data processing system.

With reference now to FIG. 4, a block diagram depicts components used to profile processes in a data processing system. A trace program 400, also referred to as Java time profiler, is used to profile processes 402. Trace program 400 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 400, which stores the trace data in buffer 404. The trace data in buffer 404 may be stored in a file for post-processing. With Java operating systems, the present invention employs trace hooks that aid in identifying interpreted methods that may be used in processes 402. In addition, since classes may be loaded and unloaded, these changes also are identified using trace data in accordance with a preferred embodiment of the present invention. This is especially relevant with "network client" data processing systems, such as those that may operate under JavaOS, since classes and jitted methods may be loaded and unloaded more frequently due to the constrained memory and role as a network client.

Figure 5:
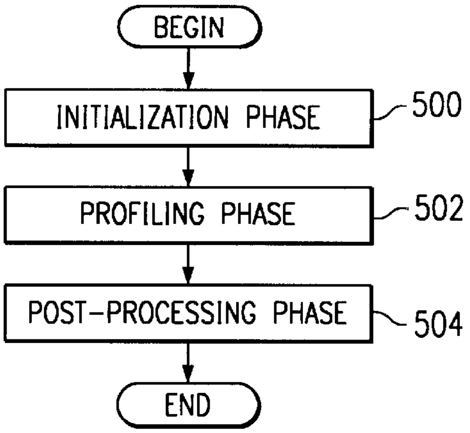
FIG. 5 is an illustration depicting various phases in profiling the active processes in an operating system.

With reference now to FIG. 5, a diagram depicts various phases in profiling the processes active in an operating system. Subject to memory constraints, the generated trace output may be as long and as detailed as the analyst requires for the purpose of profiling a particular program.

An initialization phase 500 is used to capture the state of the client machine at the time tracing is initiated. This trace initialization data includes trace records that identify all existing threads, all loaded classes, and all methods for the loaded classes. Records from trace data captured from hooks are written to indicate thread switches, interrupts, and loading and unloading of classes and jitted methods. Any class which is loaded has trace records that indicate the name of the class and its methods. In the depicted example, four byte IDs are used as identifiers for threads, classes, and methods. These IDs are associated with names output in the records. A record is written to indicate when all of the start up information has been written.

Next, during the profiling phase 502, trace records are written to a trace file. Trace records may originate from two types of profiling actions—event-based profiling and sample-based profiling. In the present invention, the trace file may have a combination of event-based records, such as those that may originate from a trace hook executed in response to a particular type of event, e.g., a method entry or method exit, and sample-based records, such as those that may originate from a stack walking function executed in response to a timer interrupt, e.g., a stack unwind record, also called a call stack record.

For example, the following process may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed.

In the post-processing phase 504, the data collected in the buffer is sent to a file for post-processing. In one configuration, the file may be sent to a server, which determines the profile for the processes on the client machine. Of course, depending on available resources, the post-processing also may be performed on the client machine. In post-processing phase 504, B-trees and/or hash tables are employed to maintain names associated with Ids as the records in the trace file are processed. A hash table employs hashing to convert an identifier or a key, meaningful to a user, into a value for the location of the corresponding data in the table. While processing trace records, the B-trees and/or hash tables are updated to reflect the current state of the client machine, including newly loaded jitted code or unloaded code. Also, in the post-processing phase 504, each trace record is processed in a serial manner. As soon as the indicator is encountered that all of the start up information has been processed, event-based trace records from trace hooks and sample-based trace records from timer interrupts are then processed. Timer interrupt information from the timer interrupt records are resolved with existing hash tables. In addition, this information identifies the thread and function being executed. The data is stored in hash tables with a count identifying the number of timer tick occurrences associated with each way of looking at the data. After all of the trace records are processed, the information is formatted for output in the form of a report.

Alternatively, trace information may be processed on-the-fly so that trace data structures are maintained during the profiling phase. In other words, while a profiling function, such as a timer interrupt, is executing, rather than (or in addition to) writing trace records to a file, the trace record information is processed to construct and maintain any appropriate data structures.

For example, during the processing of a timer interrupt during the profiling phase, a determination could be made as to whether the code being interrupted is being interpreted by the Java interpreter. If the code being interrupted is interpreted, the method ID of the method being interpreted may be placed in the trace record. In addition, the name of the method may be obtained and placed in the appropriate B-tree. Once the profiling phase has completed, the data structures may contain all the information necessary for generating a profile report without the need for postprocessing of the trace file.

Figure 6:
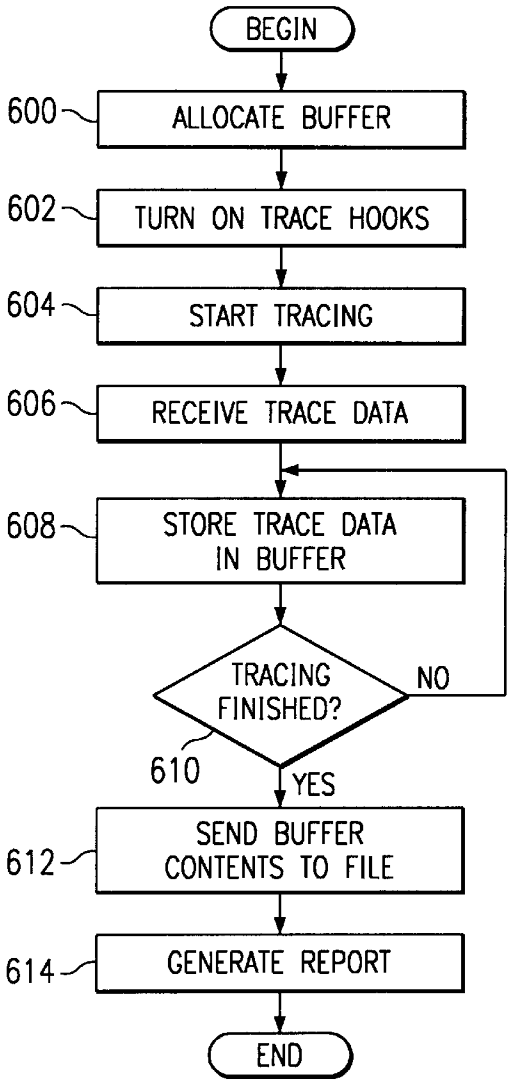
FIG. 6 is a flowchart depicting a process used by a trace program for generating trace records from processes executing on a data processing system.

With reference now to FIG. 6, a flowchart depicts a process used by a trace program for generating trace records from processes executing on a data processing system. FIG. 6 provides further detail concerning the generation of trace records that were not described with respect to FIG. 5.

Trace records are produced by the execution of small pieces of code called "hooks". Hooks may be inserted in various ways into the code executed by processes, including statistically (source code) and dynamically (through modification of a loaded executable). This process is employed after trace hooks have already been inserted into the process or processes of interest. The process begins by allocating a buffer (step 600), such as buffer 404 in FIG. 4. Next, in the depicted example, trace hooks are turned on (step 602), and tracing of the processes on the system begins (step 604). Trace data is received from the processes of interest (step 606). This type of tracing may be performed during phases 500 and/or 502. This trace data is stored as trace records in the buffer (step 608). A determination is made as to whether 10 tracing has finished (step 610). Tracing finishes when the trace buffer has been filled or the user stops tracing via a command and requests that the buffer contents be sent to file. If tracing has not finished, the process returns to step 602 as described above.

Otherwise, when tracing is finished, the buffer contents are sent to a file for post-processing (step 612). A report is then generated in post-processing (step 614) with the process terminating thereafter.

Although the depicted example uses post-processing to analyze the trace records, the processes of the present invention may be used to process trace information in real-time depending on the implementation.

Figure 7:
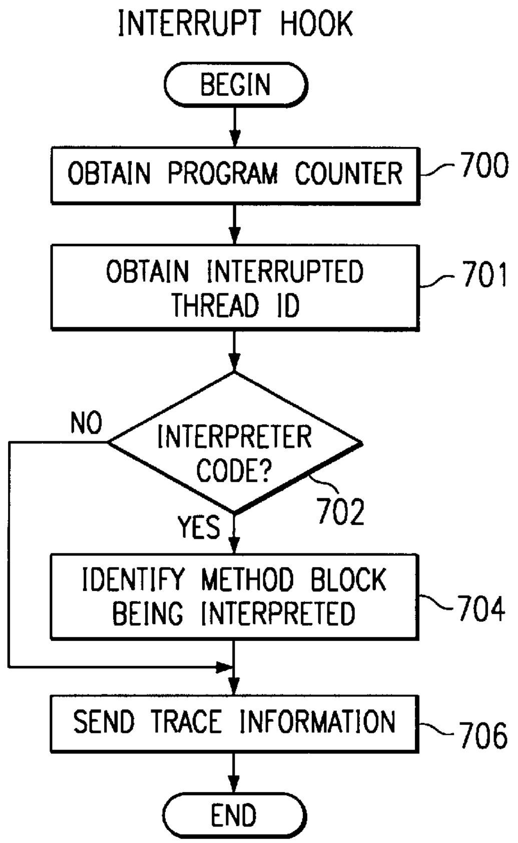
FIG. 7 is a flowchart depicting a process used in a system interrupt handler trace hook.

With reference now to FIG. 7, a flowchart depicts a process that may be used during an interrupt handler trace hook.

The process begins by obtaining a program counter (step 700). Typically, the program counter is available in one of the saved program stack areas. Thereafter, a determination is made as to whether the code being interrupted is interpreted code (step 702). This determination may be made by determining whether the program counter is within an address range for the interpreter used to interpret bytecodes. If the code being interrupted is interpreted, a method block address is obtained for the code being interpreted. A trace record is then written (step 706). The trace record is written by sending the trace information to a trace program, such as trace program 400, which generates trace records for post-processing in the depicted example. This trace record is referred to as an interrupt record, or an interrupt hook.

This type of trace may be performed during phase 502. Alternatively, a similar process, i.e. determining whether code that was interrupted is interpreted code, may occur during postprocessing of a trace file, as is shown below with respect to FIG. 15.

Figure 8:
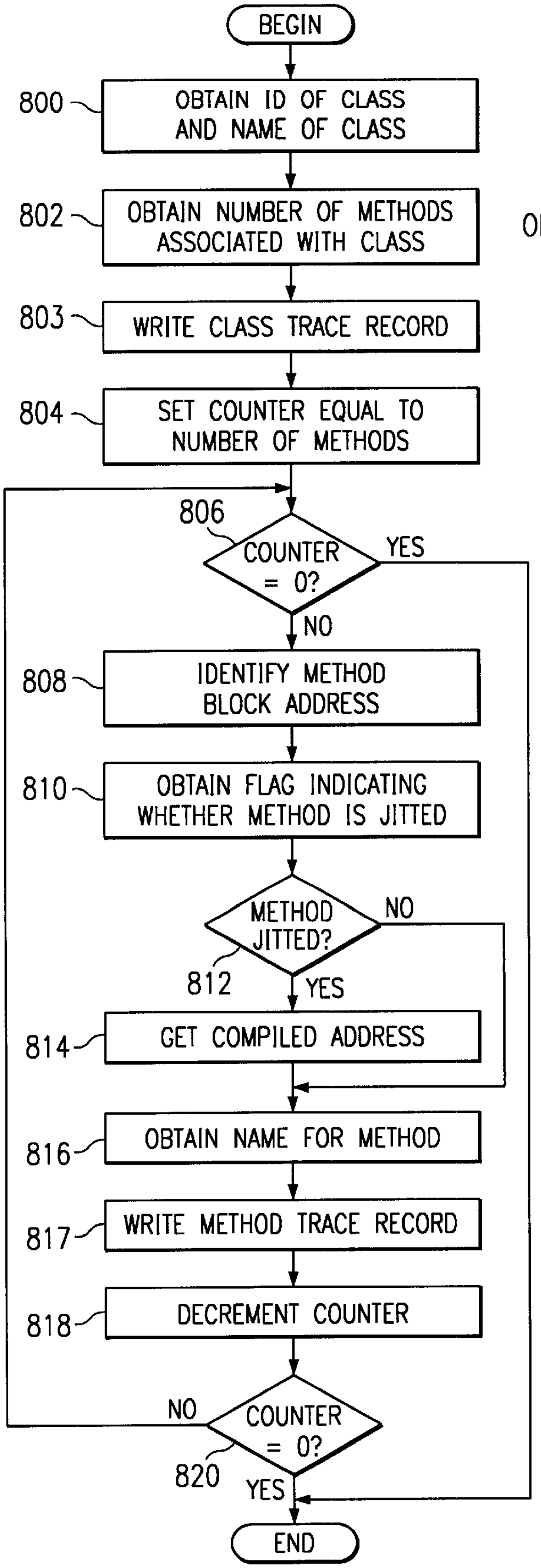
FIG. 8 is a flowchart depicting a process used to generate trace data during the initialization phase and each time a class is loaded by the JVM.

With reference now to FIG. 8, a flowchart illustrates a process used to generate trace data during the initialization phase and each time a class is loaded by the JVM. This process is employed during the initialization phase for each class that is loaded. In addition, the steps in the flowchart shown in FIG. 8 are also used each time a class is loaded during profiling or tracing of processes.

The process begins by obtaining the identification of the class and the name of the class (step 800). Then, the number of methods associated with the class are obtained (step 802) and a counter is initialized to this value. A class trace record is then written using the information (step 803). This information includes a trace record indicating the class block address and number of methods. A counter is set equal to the number of methods (step 804). Next, a determination is made as to whether the counter is equal to zero (step 806). If the counter is equal to zero, the process terminates thereafter. If the counter is non-zero, then a trace record is written for each method as follows. A method block address is identified for the next method (step 808). A flag is obtained that indicates whether the method is jitted (step 810). This flag may be obtained from a table used in a JVM. A method has been "jitted" when the bytecodes for the method have been compiled into native machine language instructions for use on the client data processing system on which the method is to be executed. The address at which the jitted code is located is the compiled address.

Then, a determination is made as to whether a compiled address is present (step 812). This determination is made by examining the flag obtained in (step 810). If a compiled address is present, the compiled address is retrieved from the JIT's table, which is an internal control block used to manage the space allocated to jitted code (step 814). A name is then obtained for the method (step 816). If the process proceeds directly to this step from step 812, then a compiled address is not present. A trace record indicating the method information, such as the method block address, flags, jitted address, and method name, is written (step 817).

Thereafter, the counter is decremented (step 818), and a determination is made as to whether the counter is equal to zero (step 820). If the counter is equal to zero, the process terminates. The trace records are startup records if the process was used during the initialization phase. If the process is employed during the loading of a class, the record is a load class and/or method records. The process will then terminate because all of the methods associated with the class will have been processed. On the other hand, if the counter is not equal to zero, the process will return to step 806.

Figure 9:
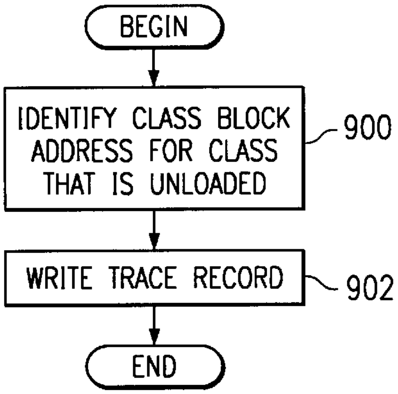
FIG. 9 is a flowchart depicting a process used by a trace hook that reports when a class is unloaded.

With reference now to FIG. 9, a flowchart depicts a process used by a trace hook to generate a trace record that records when a class is unloaded. This process is employed each time a class is unloaded. The process begins by identifying the class block address for the class that is unloaded (step 900). Then, a trace record is written (step 902) with the process terminating thereafter. The generated record is a class unload record.

Figure 10A:
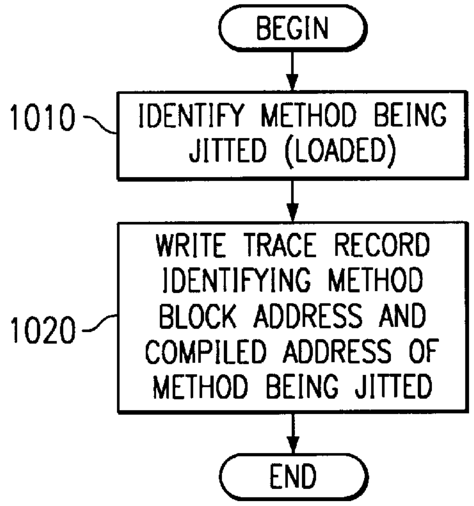
FIG. 10A is a flowchart depicting a process used when a method is loaded.

With reference now to FIG. 10A, a flowchart depicts a process used by a trace hook to generate a trace record when a method is jitted. The process identifies the method being jitted (step 1010) and writes a trace record identifying the method block address and the compiled address of the method being jitted (step 1020), after which the process terminates.

Figure 10B:
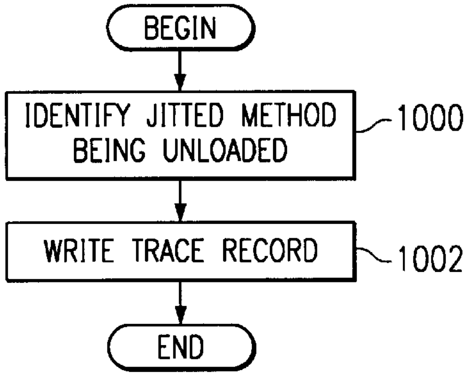
FIG. 10B is a flowchart depicting a process used when a method is unloaded.

With reference now to FIG. 10B, a flowchart depicts a process used by a trace hook to generate a trace record when a jitted method is unloaded. The process identifies the jitted method being unloaded (step 1000) and writes a trace record (step 1002) with the process terminating thereafter. Either the method block address or the compiled address may be used to identify the method.

Figure 11:
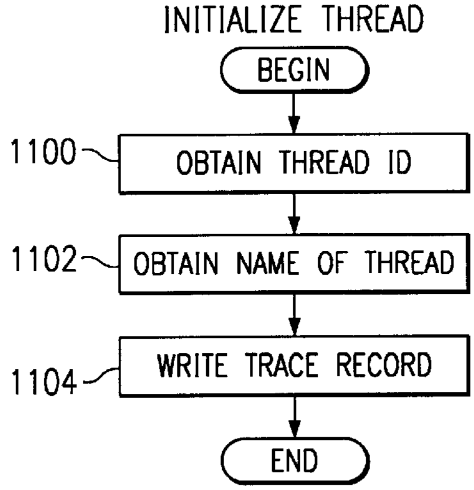
FIG. 11 is a flowchart depicting a process used by a trace hook that reports when a thread is initialized.

With reference now to FIG. 11, a flowchart depicts a process used by a trace hook that records when a thread is initialized. The process begins by obtaining a thread ID for the thread being initialized (step 1100). The name of the thread is obtained (step 1102), and a trace record is then written (step 1104) with the process terminating thereafter.

Figure 12:
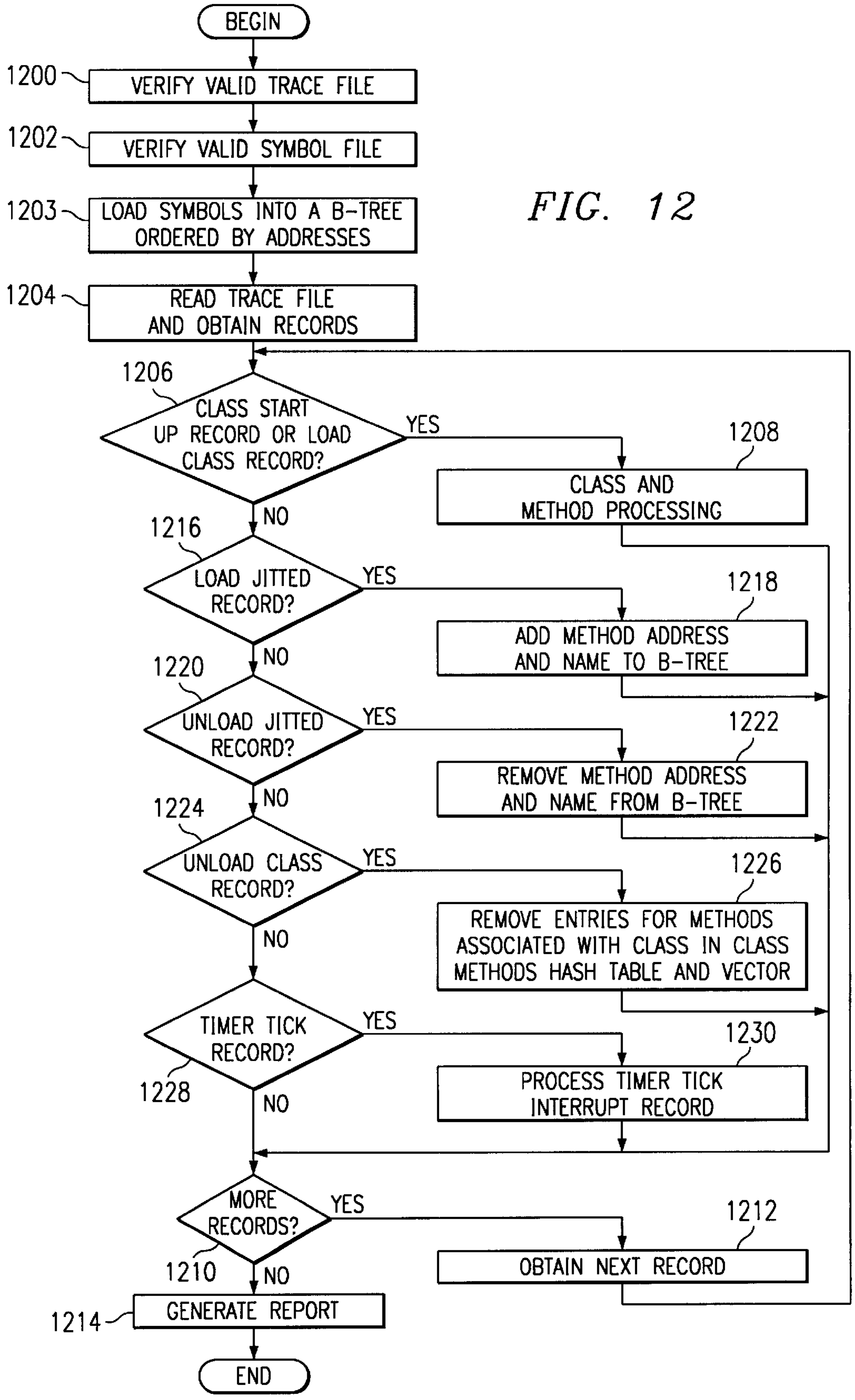
FIG. 12 is a flowchart depicting a process for processing trace records.

With reference now to FIG. 12, a flowchart depicts a process for processing trace records during the postprocessing phase. The process begins by determining whether a valid trace file is present (step 1200). If a valid trace file is not present, the process terminates. Otherwise, a determination is made as to whether a valid symbol file is present (step 1202). A symbol file contains symbolic information such as function names. A symbol file may be generated by running the Unix command "nm". The process also terminates if a valid symbol file is not present. If the symbol file is valid, then the symbols are loaded into a B-tree ordered by addresses (step 1203), and the trace file is read to obtain trace records for processing (step 1204).

A determination is made as to whether the trace record is a startup record or a load class record (step 1206). If the record is a startup record or a load class record, class and method processing is employed (step 1208) with the process then determining whether additional records are present for processing (step 1210). Step 1208 is described in more detail in FIG. 14 below. If more records are present, the process obtains the next record for processing (step 1212) and returns to step 1206. Otherwise, a report is generated (step 1214) with the process terminating thereafter.

With reference again to step 1206, if the trace record is not a class startup record or a load class record, the process determines whether the trace record is a load jitted method record (step 1216). If so, then the process adds the method address and name to the B-tree (step 1218). If the trace record is not a load jitted method record, then a determination is made as to whether the trace record is an unload jitted method record (step 1220). If so, then the process removes the method address and name from the B-tree (step 1222). If the trace record is not an unload jitted method record, then the process determines whether the trace record is an unload class record (step 1224). If the trace record is an unload class record, the process then removes entries for methods associated with the class in a class methods hash table and vector (step 1226) with the process then proceeding to step 1210 as described above. A vector is similar to a hash table except that a vector identifies an ordered relationship between vector elements.

Referring again to step 1224, if the trace record is not an unload class record, a determination is then made as to whether the trace record is a timer tick record (step 1228). If so, then the timer tick record is processed (step 1230) with the process then returning to step 1210. Step 1230 is described in more detail in FIG. 15 below. If no more records are present, a report is generated (step 1214), and the process terminates.

Figure 13:
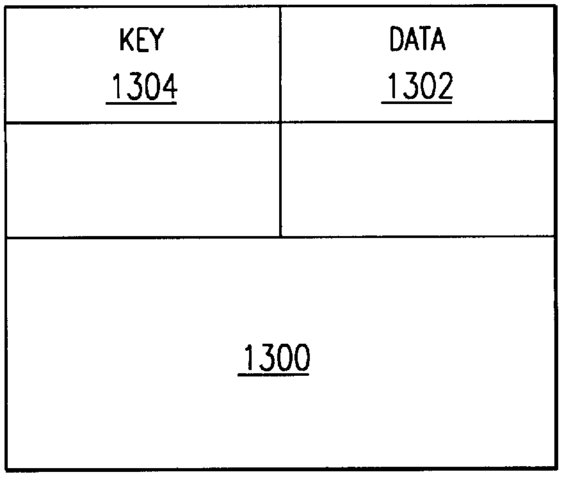
FIG. 13 is a diagram depicting a hash table.

With reference now to FIG. 13, a diagram depicts a hash table. Hash table 1300 includes data 1302, which is accessed using key 1304. Key 1304 is converted using hashing into a value for the location of data 1302 within hash table 1300. Hash table 1300 is an example of a hash table that may be used to implement the class methods hash table in step 1218 in FIG. 12. A vector is similar to a hash table except that a vector identifies an ordered relationship between vector elements.

Figure 14:
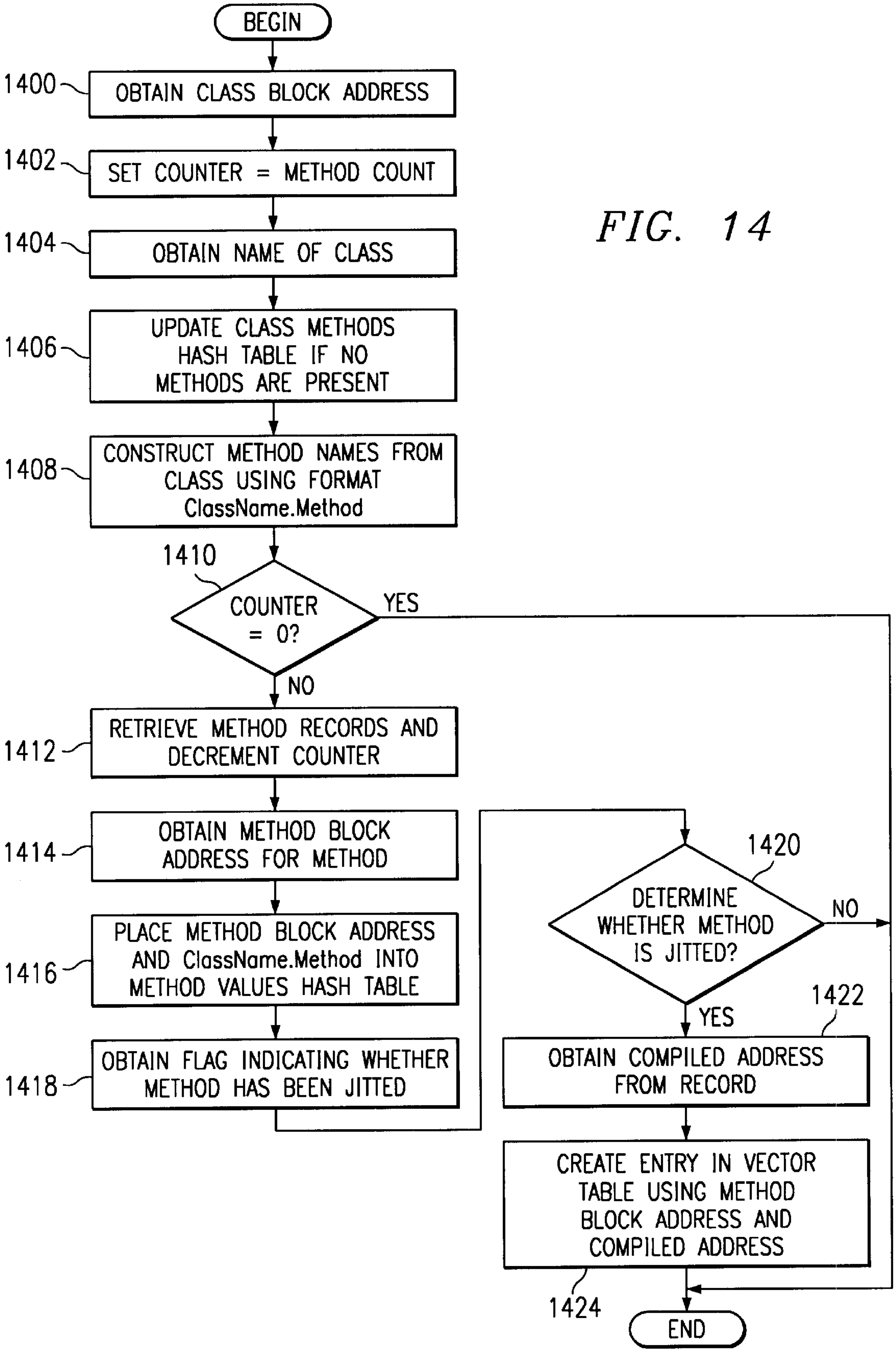
FIG. 14 is a flowchart depicting a process for class and method processing.

With reference now to FIG. 14, a flowchart depicts a process for class trace record and method trace record postprocessing. This figure is a more detailed diagram of step 1208 in FIG. 12. The process begins by obtaining the class block address from the class record (step 1400). Then, a method count is obtained, and the counter is set equal to the method count (step 1402), and the name of the class is obtained (step 1404). The information in steps 1402 and 1404 are obtained from the trace records. A class method hash table is updated if new methods are present when the method count is obtained in step 1402 (step 1406). Method names are constructed from the class identification in the record (step 1408). A determination is made as to whether the counter is equal to zero (step 1410). If the counter is equal to zero, the process terminates. Otherwise, the next method is retrieved from the trace record, and the counter is decremented (step 1412). Information for each method is located in a separate trace record. A method block address is obtained for the method in the method record (step 1414). Information about the method is placed in a method values hash table with the method block address used as a key with a string consisting of the ClassName.MethodName plus a signature used as the object or data in the hash table (step 1416). Then, a flag is obtained from the record to determine whether the method has been jitted (step 1418). A determination is made as to whether the method is jitted (step 1420). If the method is jitted, the compiled address is obtained from the trace record (step 1422). Then, an entry is created in the vector table using the method block address as the key and the compiled address as the object or data referenced by the key (step 1424) with the process terminating thereafter. The process also terminates from step 1420 if the method is not jitted.

Figure 15:
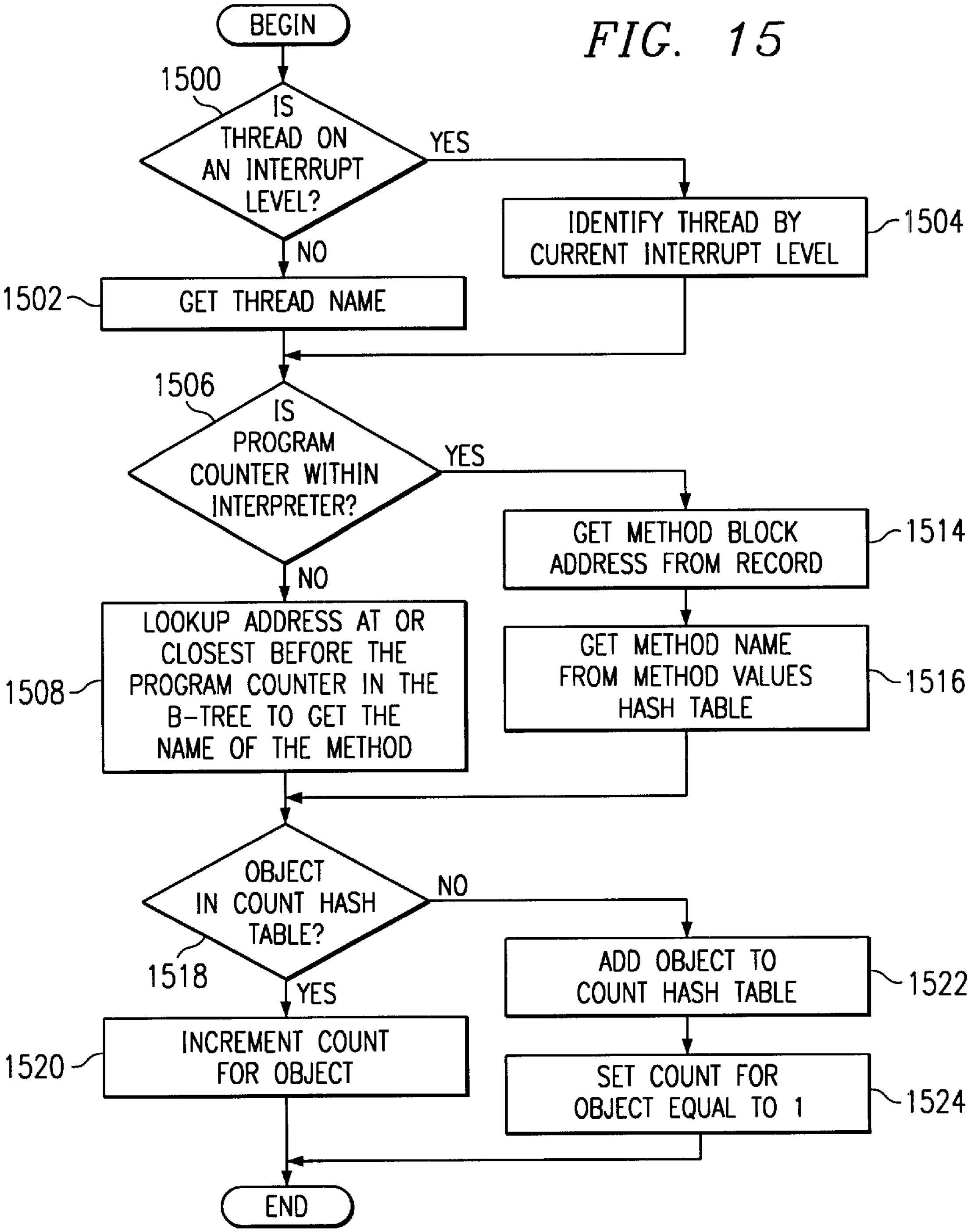
FIG. 15 is a flowchart depicting a process for thread record processing.

With reference now to FIG. 15, a flowchart depicts a process for timer tickrecord postprocessing. FIG. 15 is a more detailed description of step 1230 in FIG. 12. The process begins by determining whether the thread is on an interrupt level (step 1500). If the thread is not on an interrupt level, the process obtains the thread name (step 1502). If the thread is on an interrupt level, the thread is identified as the current interrupt level (step 1504). In either case, a determination is then made as to whether or not the program counter is within the interpreter (step 1506).

If the program counter is not within the interpreter, then the B-tree is used to lookup the address at or preceedingly closest to the program counter in the B-tree to get the name of the method that was interrupted in order to generate the timer tick record (step 1508). The process then continues with step 1518.

With reference again to step 1506, if the program counter is within the interpreter, the process then obtains the method block address from the record (step 1514). Thereafter, the method name is obtained from the method values hash table (step 1516).

Thereafter, a determination is made as to whether the method and/or thread/method, also referred to as an object, is present in the count hash table (step 1518). If the object is present, the count for the object is incremented with the process terminating thereafter (step 1520). Otherwise, the object is added to the count hash table (step 1522), and the count for the object is set equal to one (step 1524) with the process terminating thereafter. The object may be, for example, a method or thread concatenated with the method name.

As noted previously, some of the figures describe a set of processes that may be employed to obtain event-based profiling information. As applications execute, profiling information in the form of trace records may be written to a buffer or file. The trace records may then be post-processed.

Figure 17:
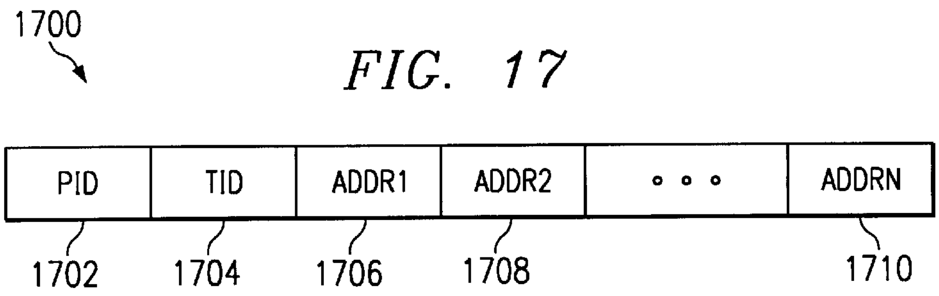
FIG. 17 is an illustration depicting a call stack sample.
Figures 16, 18A:
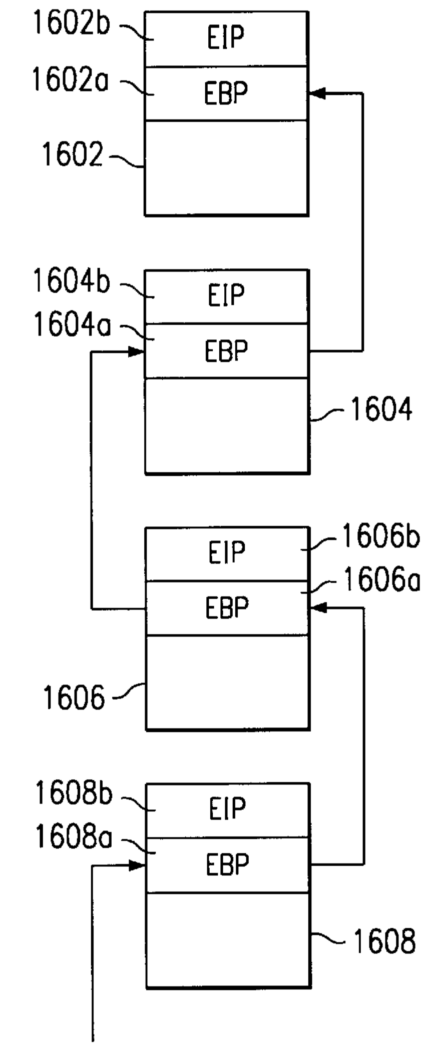
FIG. 16 is a diagram depicting the call stack containing stack frames.
FIG. 18A is a diagram depicting a program execution sequence along with the state of the call stack at each function entry/exit point.

In addition to event-based profiling, a set of processes may be employed to obtain sample-based profiling information. As applications execute, the applications may be periodically interrupted in order to obtain information about the current runtime environment. This information may be written to a buffer or file for postprocessing, or the information may be processed on-the-fly into data structures representing an ongoing history of the runtime environment. FIGS. 16 and 17 describe sample-based profiling in more detail.

A sample-based profiler obtains information from the stack of an interrupted thread. The thread is interrupted by a timer interrupt presently available in many operating systems. The user of the trace facility selects either the program counter option or the stack unwind option, which may be accomplished by enabling one major code or another major code, as described further below. This timer interrupt is employed to sample information from a call stack. By walking back up the call stack, a complete call stack can be obtained for analysis. A "stack walk" may also be described as a "stack unwind", and the process of "walking the stack" may also be described as "unwinding the stack." Each of these terms illustrates a different metaphor for the process. The process can be described as "walking" as the process must obtain and process the stack frames step-by-step. The process may also be described as "unwinding" as the process must obtain and process the stack frames that point to one another, and these pointers and their information must be "unwound" through many pointer dereferences.

The stack unwind records the sequence of functions/method calls at the time of the interrupt. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during timer interrupt processing or at postprocessing, the generated sample-based profile information reflects a sampling of call stacks, not just leaves of the possible call stacks, as in some program counter sampling techniques. Leaves are nodes in the call stack tree structure, described further below, that are the farthest distance from the root node, also referred to as the primary node. In other words, a leaf is a node at the end of a branch (or a node that has no descendants). A descendant is a child of a parent node, and a leaf is a node that has no children.

With reference now FIG. 16, a diagram depicts the call stack containing stack frames. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls—in other words, it reflects the function invocation sequence at any point in time.

Call stack 1600 includes information identifying the routine that is currently running, the routine that invoked it, and so on all the way up to the main program. Call stack 1600 includes a number of stack frames 1602, 1604, 1606, and 1608. In the depicted example, stack frame 1602 is at the top of call stack 1600, while stack frame 1608 is located at the bottom of call stack 1600. The top of the call stack is also referred to as the "root". The timer interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame). By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architecture, this example is not a restriction. Most architectures employ linkage conventions that can be similarly navigated by a modified profiling interrupt handler.

When a timer interrupt occurs, the first parameter acquired is the program counter value. The next value is the pointer to the top of the current stack frame for the interrupted thread. In the depicted example, this value would point to EBP 1608*a* in stack frame 1608. In turn, EBP 1608 points to EBP 1606*a* in stack frame 1606, which in turn points to EBP 1604*a* in stack frame 1604. In turn, this EBP points to EBP 1602*a* in stack frame 1602. Within stack frames 1602–1608 are EIPs 1602*b*–1608*b*, which identify the calling routine's return address. The routines may be identified from these addresses. Thus, routines are defined by collecting all of the return addresses by walking up or backwards through the stack.

With reference now to the FIG. 17, an illustration of a call stack is depicted. A call stack, such as call stack 1700 is obtained by walking the call stack. A call stack is obtained each time a periodic event, such as, for example, a timer interrupt occurs. These call stacks may be stored as call stack unwind trace records within the trace file for postprocessing or may be processed on-the-fly while the program continues to execute.

In the depicted example, call stack 1700 contains a pid 1702, which is the process identifier, and a tid 1704, which is the thread identifier. Call stack 1700 also contains addresses addr1 1706, addr2 1708 . . . addrN 1710. In this example, addr1 1706 represents the value of the program counter at the time of the interrupt. This address occurs somewhere within the scope of the interrupted function. addr2 1708 represents an address within the process that called the function that was interrupted. For Intel-processor-based data processing systems, it represents the return address for that call; decrementing that value by 4 results in the address of the actual call, also known as the call-site. This corresponds with EIP 1608*b* in FIG. 16. addrN 1710 is the top of the call stack (EIP 1602*b*). The call stack that would be returned if the timer interrupt interrupted the thread whose call stack state is depicted in FIG. 16 would consist of: a pid, which is the process id of the interrupted thread; a tid, which is the thread id for the interrupted thread; a pcv, which is a program counter value (not shown on FIG. 16) for the interrupted thread; EIP 1608*b*; EIP 1606*b*; EIP 1604*b*; and EIP 1602*b*. In terms of FIG. 17, pcv=addr1, EIP 1608*b* =addr2, EIP 1606*b* =addr3, EIP 1604*b* =addr4, EIP 1602*b* =addr5.

With reference now to FIG. 18A, a diagram of a program execution sequence along with the state of the call stack at each function entry/exit point is provided. The illustration shows entries and exits occurring at regular time intervals, but this is only a simplification for the illustration. If each function (A, B, C, and X in the figure) were instrumented with entry/exit event hooks, then complete accounting of the time spent within and below each function would be readily obtained. Note in FIG. 18A that at time 0, the executing thread is in routine C. The call stack at time 0 is C. At time 1, routine C calls routine A, and the call stack becomes CA and so on. It should be noted that the call stack in FIG. 18A is a reconstructed call stack that is generated by processing the event-based trace records in a trace file to follow such events as method entries and method exits. The use of call stack unwind records in conjunction with the use of a reconstructed call stack from event-based trace records is described in more detail further below.

The accounting technique and data structure are described in more detail further below. Unfortunately, this type of instrumentation can be expensive, can introduce bias and in some cases can be hard to apply. Sample-based profiling, by sampling the program's call stack, helps to alleviate the performance bias (and other complications) that entry/exit hooks produce.

Consider FIG. 18B, in which the same program is executed, but is being sampled on a regular basis (in the example, the interrupt occurs at a frequency equivalent to two timestamp values). Each sample includes a snapshot of the interrupted thread's call stack. Not all call stack combinations are seen with this technique (note that routine X does not show up at all in the set of call stack samples in FIG. 18B). This is an acceptable limitation of sampling. The idea is that with an appropriate sampling rate (e.g., 30–1000 times per second), the call stacks in which most of the time is spent will be identified. It does not really matter if some call stacks are omitted, provided these call stacks are combinations for which little time is consumed.

In the event-based traces, there is a fundamental assumption that the traces contain information about routine entries and matching routine exits. Often, entry-exit pairs are nested in the traces because routines call other routines. Time spent (or memory consumed) between entry into a routine and exit from the same routine is attributed to that routine, but a user of a profiling tool may want to distinguish between time spent directly in a routine and time spent in other routines that it calls.

FIG. 18C shows an example of the manner in which time may be expended by two routine: a program's main calls routine A at time t equal to zero; routine A computes for 1 ms and then calls routine B; routine B computes for 8 ms and then returns to routine A; routine A computes for 1 ms and then returns to main. From the point of view of main, routine A took 10 ms to execute, but most of that time was spent executing instructions in routine B and was not spent executing instructions within routine A. This is a useful piece of information for a person attempting to optimize the example program. In addition, if routine B is called from many places in the program, it might be useful to know how much of the time spent in routine B was on behalf of (or when called by) routine A and how much of the time was on behalf of other routines. The sample-based profiling described herein attempts to provide some information about the routines in which a program spends some time when event-based trace records do not capture all of the desired information.

A fundamental concept in the output provided by the methods described herein is the call stack. The call stack consists of the routine that is currently running, the routine that invoked it, and so on all the way up to main. The sample-based profiler may add one level above that with the pid/tid (the process Ids and thread Ids). However, an attempt is made to follow the trace event records, such as method entries and exits, as shown in FIG. 18A, to reconstruct the structure of the call stack frames while the program was executing at various times during the trace.

The present invention can provide a report consisting of three kinds of time spent in a routine, such as routine A: (1) base time—the time spent executing code in routine A itself; (2) cumulative time (shortened to cum time)—the time spent executing in routine A plus all the time spent executing every routine that routine A calls (and all the routines they call, etc.); and (3) wall-clock time or elapsed time. This type of timing information may be obtained from event-based trace records as these records have timestamp information for each record.

A routine's cum time is the sum of all the time spent executing the routine plus the time spent executing any other routine while that routine is below it on the call stack. In the example above in FIG. 18C, routine A's base time is 2 ms, and its cum time is 10 ms. Routine B's base time is 8 ms, and its cum time is also 8 ms because it does not call any other routines. It should be noted that cum time may not be generated if a call stack tree is being generated on-the-fly—cum time may only be computed after the fact during the postprocessing phase of a profile utility.

For wall-clock or elapsed time, if while routine B was running, the system fielded an interrupt or suspended this thread to run another thread, or if routine B blocked waiting on a lock or I/O, then routine B and all the entries above routine B on the call stack accumulate elapsed time but not base or cum time. Base and cum time are unaffected by interrupts, dispatching, or blocking. Base time only increases while a routine is running, and cum time only increases while the routine or a routine below it on the call stack is running.

In the example in FIG. 18C, routine A's elapsed time is the same as its cum time—10 ms. Changing the example slightly, suppose there was a 1 ms interrupt in the middle of B, as shown in FIG. 18D. Routine A's base and cum time are unchanged at 2 ms and 10 ms, but its elapsed time is now 11 ms.

Although base, cum and elapsed in terms of processor time spent in routines, sample based profiling is useful for attributing consumption of almost any system resource to a set of routines, as described in more detail below with respect to FIG. 19B. Referring to FIG. 18C again, if routine A initiated two disk I/O's, and that routine B initiated three more I/O's when called by routine A, routine A's "base I/O's" are two and routine A's "cum I/O's" are five. "Elapsed I/O's" would be all I/O's, including those by other threads and processes, that occurred between entry to routine A and exit from routine A. More general definitions for the accounting concepts during profiling would be the following: base—the amount of the tracked system resource consumed directly by this routine; cum—the amount of the tracked system resource consumed by this routine and all routines below it on the call stack; elapsed—the total amount of the tracked system resource consumed (by any routine) between entry to this routine and exit from the routine.

As noted above, FIGS. 18A–18D describe the process by which a reconstructed call stack may be generated by processing the event-based trace records in a trace file by following such events as method entries and method exits. The use of call stack unwind records from sample-based profiling in conjunction with the use of a reconstructed call stack from event-based trace records is described in more detail further below with respect to FIG. 23. Hence, although FIGS. 19A–22 describe call stack trees that may be applicable to processing sample-based trace records, the description below for generating or reconstructing call stacks and call stack trees in FIGS. 19A–22 is mainly directed to the processing of event-based trace records.

Figure 19A:
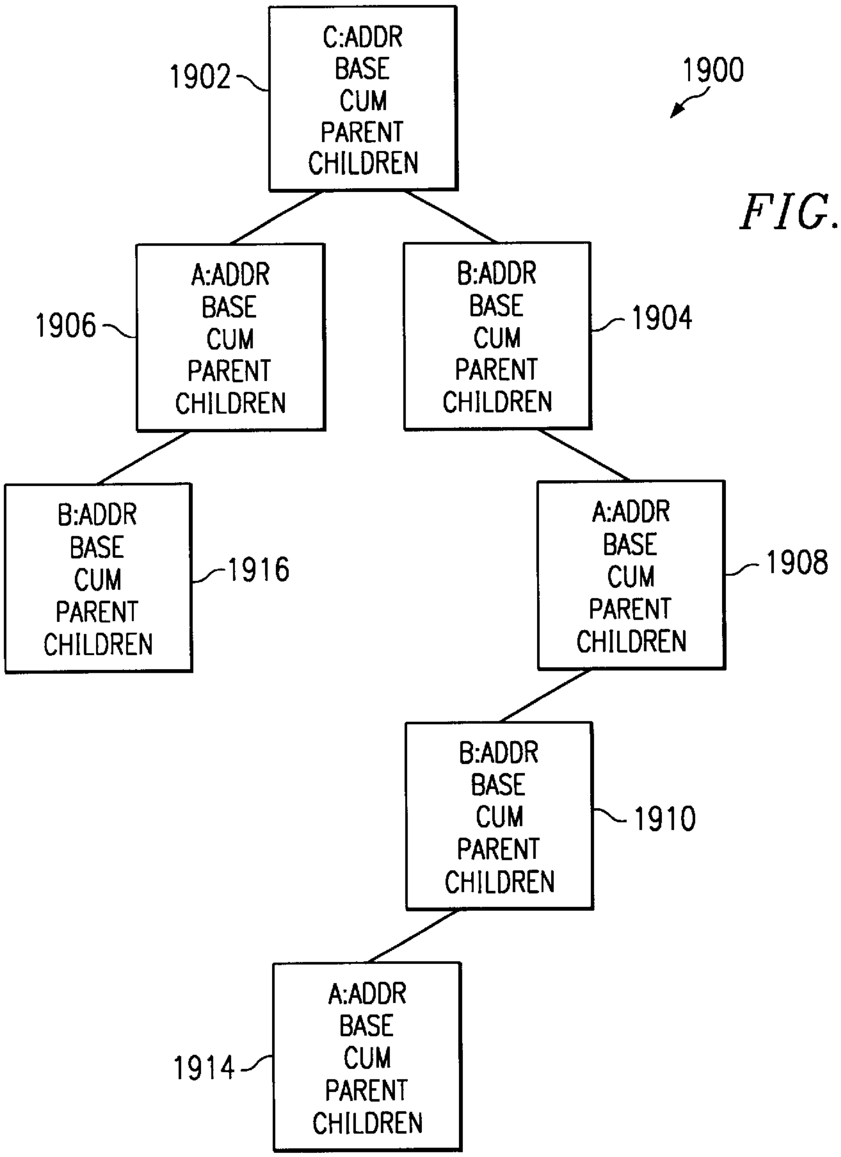
FIG. 19A is a diagram depicting a tree structure generated from sampling a call stack.

With reference now to FIG. 19A, a diagram depicts a tree structure generated from trace data. This figure illustrates a call stack tree 1900 in which each node in tree structure 1900 represents a function entry point.

Additionally, in each node in tree structure 1900, a number of statistics are recorded. In the depicted example, each node, nodes 1902–1908, contains an address (addr), a base time (BASE), cumulative time (CUM) and parent and children pointers. As noted above, this type of timing information may be obtained from event-based trace records as these records have timestamp information for each record. The address represents a function entry point. The base time represents the amount of time consumed directly by this thread executing this function. The cumulative time is the amount of time consumed by this thread executing this function and all functions below it on the call stack. In the depicted example, pointers are included for each node. One pointer is a parent pointer, a pointer to the node's parent. Each node also contains a pointer to each child of the node.

Those of ordinary skill in the art will appreciate that tree structure 1900 may be implemented in a variety of ways and that many different types of statistics may be maintained at the nodes other than those in the depicted example.

The call stack is developed from looking back at all return addresses. These return addresses will resolve within the bodies of those functions. This information allows for accounting discrimination between distinct invocations of the same function. In other words, if function X has 2 distinct calls to function A, the time associated with those calls can be accounted for separately. However, most reports would not make this distinction.

Figure 19B:
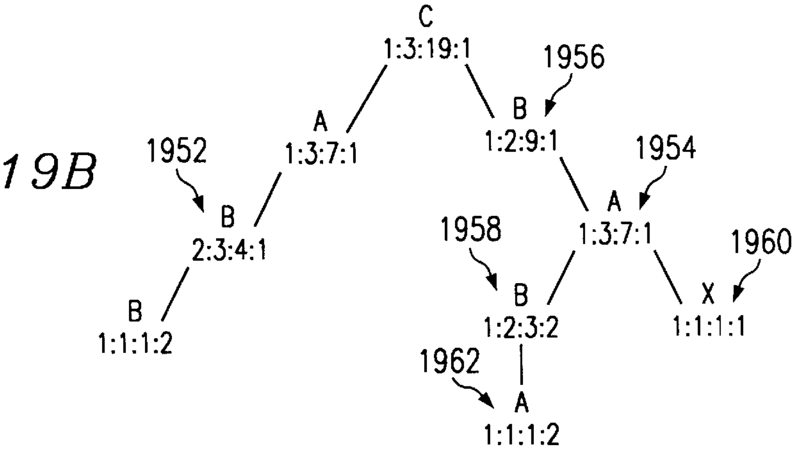
FIG. 19B is a diagram depicting an event tree which reflects call stacks observed during system execution.

With reference now to FIG. 19B, a call stacktree which reflects call stacks observed during a specific example of system execution will now be described. At each node in the tree, several statistics are recorded. In the example shown in FIG. 19B, the statistics are time-based statistics. The particular statistics shown include the number of distinct times the call stack is produced, the sum of the time spent in the call stack, the total time spent in the call stack plus the time in those call stacks invoked from this call stack (referred to as cumulative time), and the number of instances of this routine above this instance (indicating depth of recursion).

For example, at node 1952 in FIG. 19B, the call stack is CAB, and the statistics kept for this node are 2:3:4:1. Note that call stack CAB is first produced at time 2 in FIG. 18A, and is exited at time 3. Call stack CAB is produced again at time 4, and is exited at time 7. Thus, the first statistic indicates that this particular call stack, CAB, is produced twice in the trace. The second statistic indicates that call stack Cab exists for three units of time (at time 2, time 4, and time 6). The third statistic indicates the cumulative amount of time spent in call stack CAB and those call stacks invoked from call stack CAB (I.e. those call stacks having CAB as a prefix, in this case CABB). The cumulative time in the example shown in FIG. 19B is four units of time. Finally, the recursion depth of call stack CAB is one, as none of the three routines present in the call stack have been recursively entered.

Those skilled in the art will appreciate that the tree structure depicted in FIG. 19B may be implemented in a variety of ways, and a variety of different types of statistics may be maintained at each node. In the described embodiment, each node in the tree contains data and pointers. The data include the name of the routine at that node, and the four statistics discussed above. Of course, many other types of statistical information may be stored at each node. In the described embodiment, the pointers for each node include a pointer to the node's parent, a pointer to the first child of the node (i.e. the left-most child), a pointer to the next sibling of the node, and a pointer to the next instance of a given routine in the tree. For example, in FIG. 19B, node 1954 would contain a parent pointer to node 1956, a first child pointer to node 1958, a next sibling pointer equal to NULL (note that node 1954 does not have a next sibling), and a next instance pointer to node 1962. Those skilled in the art will appreciate that other pointers may be stored to make subsequent analysis more efficient. In addition, other structural elements, such as tables for the properties of a routine that are invariant across instances (e.g., the routine's name), may also be stored.

The type of performance information and statistics maintained at each node are not constrained to time-based performance statistics. The present invention may be used to present many types of trace information in a compact manner which supports performance queries. For example, rather than keeping statistics regarding time, tracing may be used to track the number of Java bytecodes executed in each method (i.e. routine) called. The tree structure of the present invention would then contain statistics regarding bytecodes executed rather than time. In particular, the quantities recorded in the second and third categories would reflect the number of bytecodes executed rather than the amount of time spent in each method.

Tracing may also be used to track memory allocation and deallocation. Every time a routine creates an object, a trace record could be generated. The tree structure of the present invention would then be used to efficiently store and retrieve information regarding memory allocation. Each node would represent the number of method calls, the amount of memory allocated within a method, the amount of memory allocated by methods called by the method, and the number of methods above this instance (i.e. the measure of recursion). Those skilled in the art will appreciate that the tree structure of the present invention may be used to represent a variety of performance data in a manner which is very compact, and allows a wide variety of performance queries to be performed.

The tree structure shown in FIG. 19B depicts one way in which data may be pictorially presented to a user. The same data may also be presented to a user in tabular form as shown in FIG. 20.

With reference now to FIG. 20, a call stack tree presented as a table will now be described. Note that FIG. 20 contains a routine, pt__pidtid, which is the main process/thread which calls routine C. Table 20 includes columns of data for Level 2030, RL 2032, Calls 2034, Base 2036, Cum 2038, and Indent 2040. Level 2030 is the tree level (counting from the root as level 0) of the node. RL 2032 is the recursion level. Calls 2034 is the number of occurrences of this particular call stack, i.e. the number of times this distinct call stack configuration occurs. Base 2036 is the total observed time in the particular call stack, i.e. the total time that the stack had exactly these routines on the stack. Cum 2038 is the total time in the particular call stack plus deeper levels below it. Indent 2040 depicts the level of the tree in an indented manner. From this type of call stack configuration information, it is possible to infer each unique call stack configuration, how many times the call stack configuration occurred, and how long it persisted on the stack. This type of information also provides the dynamic structure of a program, as it is possible to see which routine called which other routine. However, there is no notion of time-order in the call stack tree. It cannot be inferred that routines at a certain level were called before or after other routines on the same level.

Figure 21:
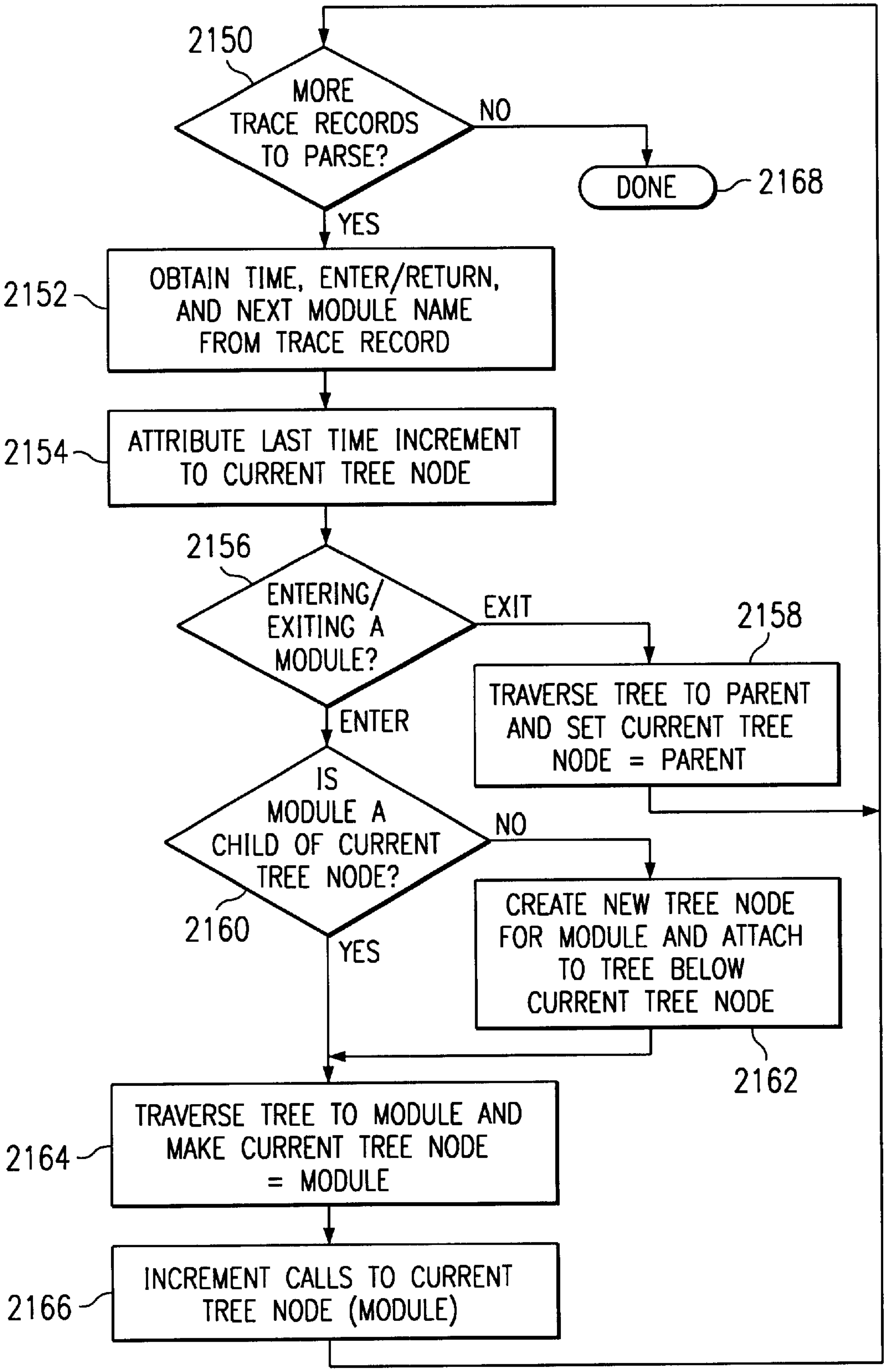
FIG. 21 is a flow chart depicting a method for building a call stack tree using a trace text file as input.

The pictorial view of the call stack tree, as illustrated in FIG. 19B, may be built dynamically or built statically using a trace text file or binary file as input. FIG. 21 depicts a flow chart of a method for building a call stack tree using a trace text file as input. In FIG. 21, the call stack tree is being built to illustrate module entry and exit points.

With reference now to FIG. 21, it is first determined if there are more trace records in the trace text file (step 2150). If so, several pieces of data are obtained from the trace record, including the time, whether the event is an enter or a return, and the module name (step 2152). Next, the last time increment is attributed to the current node in the tree (step 2154). A check is made to determine if the trace record is an enter or an exit record (step 2156). If it is an exit record, the tree is traversed to the parent (using the parent pointer), and the current tree node is set equal to the parent node (step 2158). If the trace record is an enter record, a check is made to determine if the module is already a child node of the current tree node (step 2160). If not, a new node is created for the module and it is attached to the tree below the current tree node (step 2162). The tree is then traversed to the module's node, and the current tree node is set equal to the module node (step 2164). The number of calls to the current tree node is then incremented (step 2166). This process is repeated for each trace record in the trace output file, until there are no more trace records to parse (step 2168).

Figure 22:
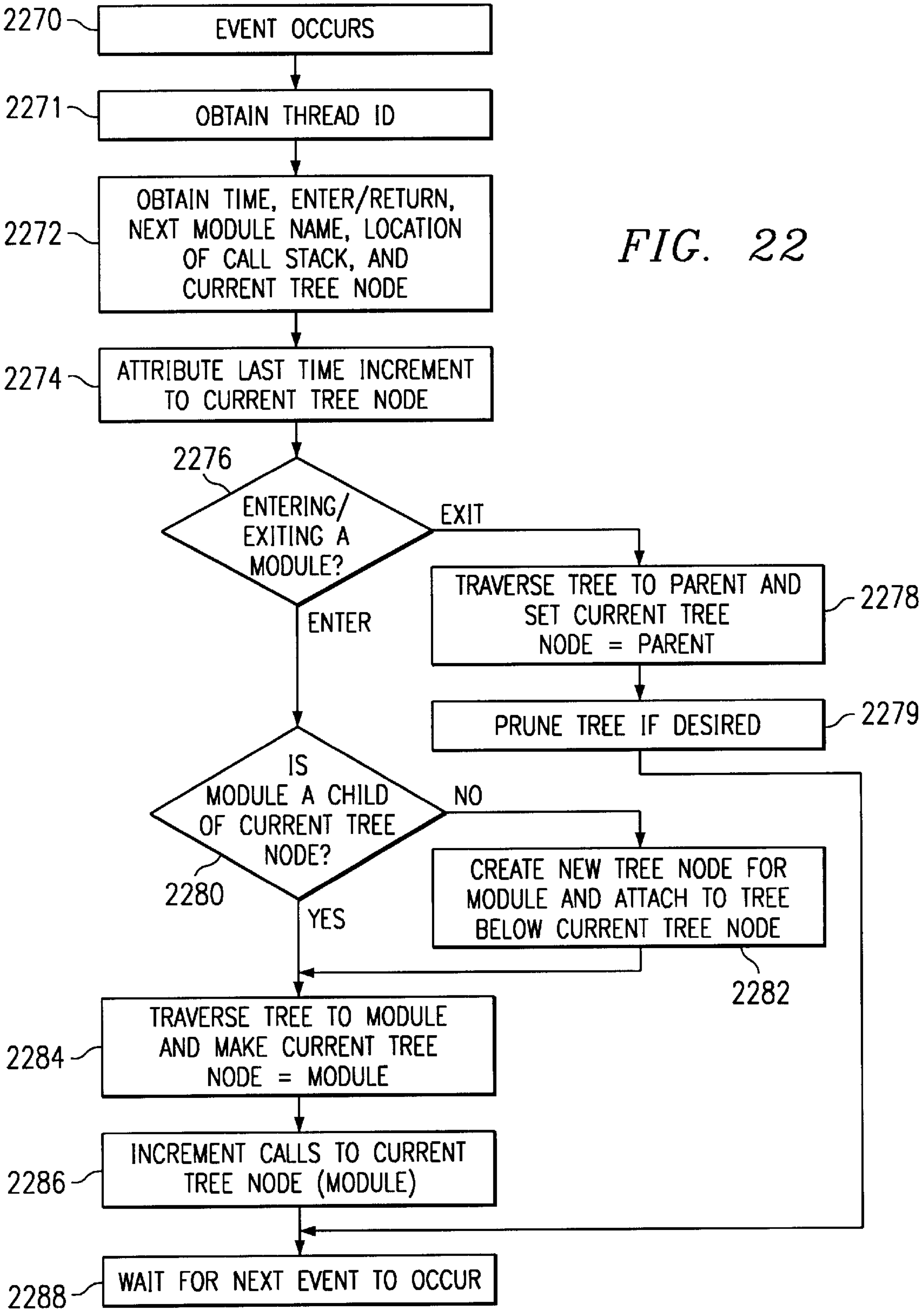
FIG. 22 is a flow chart depicting a method for building a call stack tree dynamically as tracing is taking place during system execution.

With reference now to FIG. 22, a flow chart depicts a method for building a call stack tree dynamically as tracing is taking place during system execution. In FIG. 22, as an event is logged, it is added to the tree in real time. Preferably, a call stack tree is maintained for each thread. The call stack tree reflects the call stacks recorded to date, and a current tree node field indicates the current location in a particular tree. When an event occurs (step 2270), the thread ID is obtained (step 2271). The time, type of event (i.e. in this case, whether the event is a method entry or exit), the name of the module (i.e. method), location of the thread's call stack, and location of the thread's "current tree node" are then obtained (stem 2272). The last time increment is attributed to the current tree node (step 2274). A check is made to determine if the trace event is an enter or an exit event (step 2276). If it is an exit event, the tree is traversed to the parent (using the parent pointer), and the current tree node is set equal to the parent node (step 2278). At this point, the tree can be dynamically pruned in order to reduce the amount of memory dedicated to its maintenance (step 2279). Pruning is discussed in more detail below. If the trace event is an enter event, a check is made to determine if the module is already a child node of the current tree node (step 2280). If not, a new node is created for the module and it attached to the tree below the current tree node (step 2282). The tree is then traversed to the module's node, and the current tree node is set equal to the module node (step 2284). The number of calls to the current tree node is then incremented (step 2286). Control is then passed back to the executing module, and the dynamic tracing/reduction program waits for the next event to occur (step 2288).

One of the advantages of using the dynamic tracing/reduction technique described in FIG. 22 is its enablement of long-term system trace collection with a finite memory buffer. Very detailed performance profiles may be obtained without the expense of an "infinite" trace buffer. Coupled with dynamic pruning, the method depicted in FIG. 22 can support a fixed-buffer-size trace mechanism.

The use of dynamic tracing and reduction (and dynamic pruning in some cases) is especially useful in profiling the performance characteristics of long running programs. In the case of long running programs, a finite trace buffer can severely impact the amount of useful trace information that may be collected and analyzed. By using dynamic tracing and reduction (and perhaps dynamic pruning), and accurate and informative performance profile may be obtained for a long running program.

Dynamic pruning is not required to use the method of the present invention. Many long-running applications reach a type of steady-state, where every possible routine and call stack is present in the tree and updating statistics. Thus, trace data can be recorded and stored for such applications indefinitely within the constraints of a bounded memory requirement. Pruning has value in reducing the memory requirement for those situations in which the call stacks are actually unbounded. For example, unbounded call stacks are produced by applications that load and run other applications.

Pruning can be performed in many ways, and a variety of pruning criteria is possible. For example, pruning decisions may be based on the amount of cumulative time attributed to a subtree. Note that pruning may be disabled unless the amount of memory dedicated to maintaining the call stack exceeds some limit. As an exit event is encountered (such as step 2278 in FIG. 22), the cumulative time associated with the current node is compared with the cumulative time associated with the parent node. If the ratio of these two cumulative times does not exceed a pruning threshold (e.g., 0.1), then the current node and all of its descendants are removed from the tree. The algorithm to build the tree proceeds as before by traversing to the parent, and changing the current node to the parent.

Many variations of the above pruning mechanism are possible. For example, the pruning threshold can be raised or lowered to regulate the level of pruning from very aggressive to none. More global techniques are also possible, including a periodic sweep of the entire call stack tree, removing all subtrees whose individual cumulative times are not a significant fraction of their parent node's cumulative times.

The performance data reduction of the present invention allows analysis programs to easily and quickly answer many questions regarding how computing time was spent within the traced program. This information may be gathered by "walking the tree" and accumulating the data stored at various nodes within the call stack tree, from which it can be determined the amount of time spent strictly within routine A, the total amount of time spent in routine A and in the routines called by routine A either directly or indirectly, etc.

Figure 23:
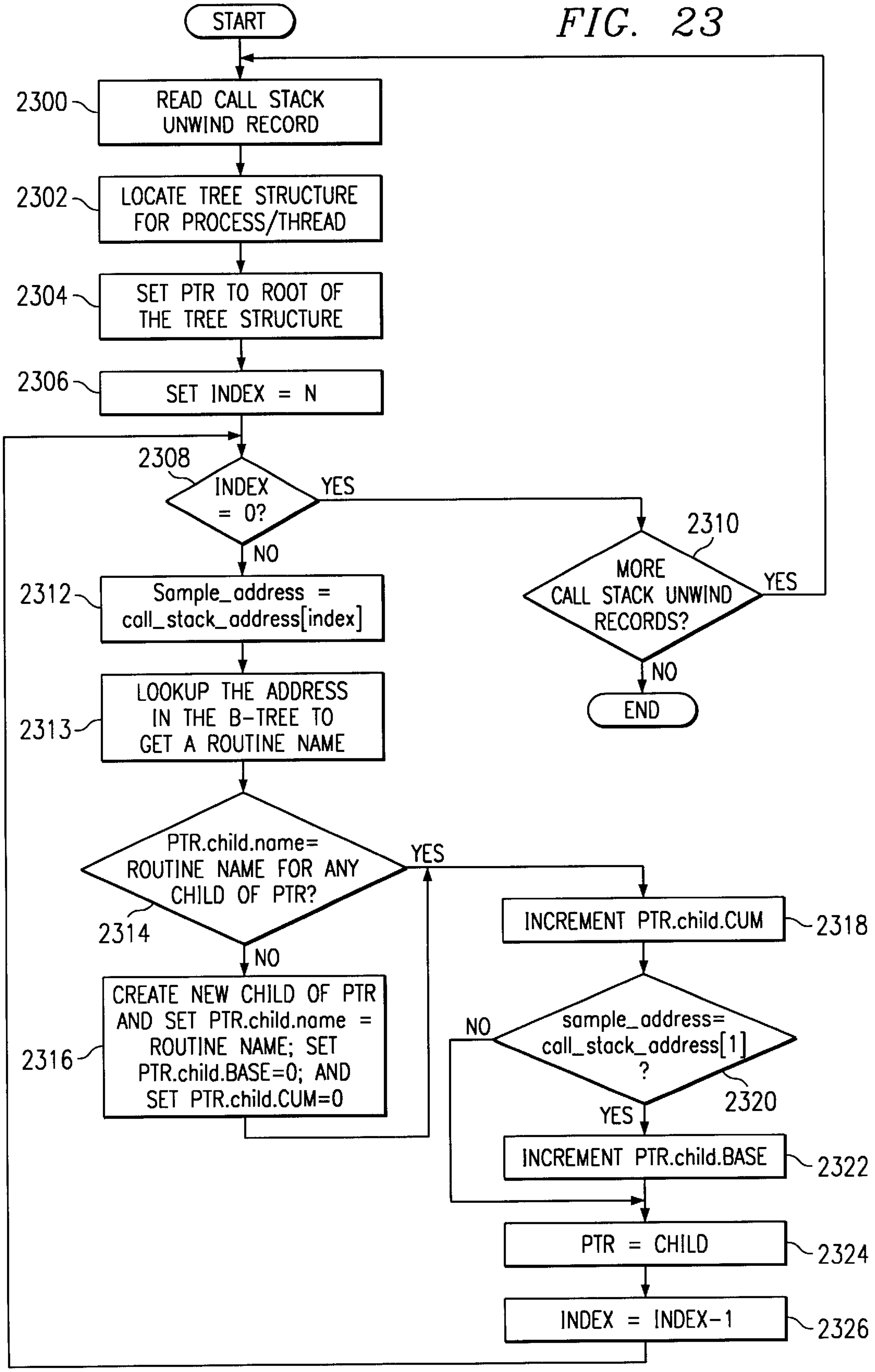
FIG. 23 is a flowchart depicting a process for creating a call stack tree structure.

With reference now to FIG. 23, a flowchart depicts a process for creating a call stack tree structure from call stack unwind records (sample-based trace records) in a trace file. FIGS. 18A–22 above primarily showed the processes involved in generating a call stack tree from event-based trace records, which show events such as method entries and method exits. These types of trace records allow a call stack to be generated, usually during a postprocessing phase of the profile tool or utility. Using timer interrupts, a profiling function may walk an active call stack to generate a call stack unwind trace record. FIG. 23 describes a process for combining the information in a call stack unwind trace record into a call stack tree. The call stack tree may have been previously constructed from other call stack unwind trace records or from event-based trace records according to the methods described in FIGS. 19A–22.

The process begins by reading a call stack unwind record (step 2300). This step processes the call stack information in the record to determine what routines are or were executing when the timer interrupt occurs or occurred, depending on whether the call stack unwind record is being processed on-the-fly or is being postprocessed. A sample-based profiling function avoids, through the call stack unwind, the need for adding additional instructions to the programs, which affects the performance and time spent in routines. Next, the tree structure for this process/thread (pid, tid) is located (step 2302). Then, the pointer (PTR) is set to the root of this tree structure by setting PTR=root(pid, tid) (step 2304). The index is set equal to N, which is the number of entries in the call stack (step 2306).

A determination is made as to whether the index is equal to zero (step 2308). If the index is equal to zero, the process then returns to determine whether additional call stack unwind trace records are present for processing (step 2310). If additional call stack unwind trace records are present, the process then returns to step 2300 to read another call stack unwind trace record. Otherwise, the process terminates.

On the other hand, if the index is not equal to zero, the process then sets sample__address equal to the call__stack__address[index] (step 2312). The B-tree is then used to lookup the address to get a routine name (step 2313). Next, a determination is made as to whether PTR.child.name for any child of PTR is equal to the looked-up routine name (step 2314). In other words, this step determines whether the routine name has ever been seen at this level in the tree structure. If the address has never been seen at this level in the tree structure, a new child of PTR is created and the PTR.child.name is set equal to the routine name, the variable PTR.child.BASE for the node is set equal to zero, and the variable PTR.child.CUM for the node is set equal to zero (step 2316). Thereafter, the cumulative time for the node is incremented by incrementing the variable PTR.child.CUM (step 2318). The process also proceeds to step 2318 from step 2314 if the address has been seen at this level. In the case of sample-based trace records, the "cumulative" time represents the number of times that this particular call stack configuration has been processed.

Next, a determination is made as to whether the sample address, sample__address, is equal the last address in the call stack sample, call__stack__address[1] (step 2320). If the sample address is equal to the address being processed, the base time for the node is incremented by incrementing the variable PTR.child.BASE (step 2322). The pointer PTR is then set equal to the child (step 2324), and the index is decremented (step 2326) with the process then returning to step 2308 as previously described. With reference again to step 2320, if the sample address is not equal to the address being processed, the process then proceeds to step 2324.

In the depicted example in FIG. 23, the process is used to process call stack unwind records recorded during execution of a program. The illustrated process also may be implemented to dynamically process call stack unwind records during execution of a program. For example, step 2310 may be modified to wait until the next timer interrupt occurs and then continue to loop back to step 2310 at the next interrupt.

The addresses obtained during sampling are used to identify functions. The functions are identified by mapping these addresses into functions.

Figure 24:
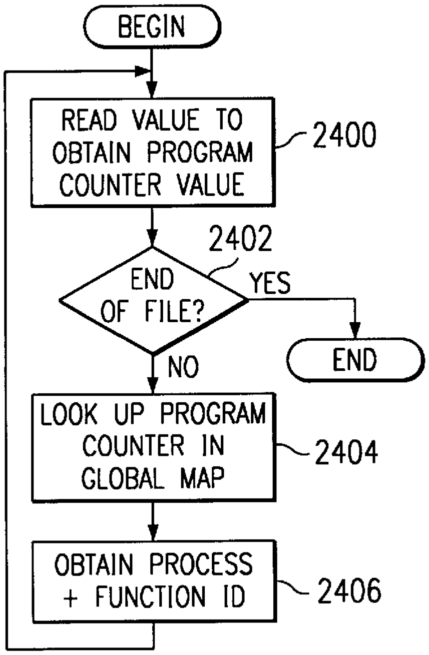
FIG. 24 is a flowchart depicting a process for identifying functions from an address obtained during sampling.

With reference now to FIG. 24, a flowchart depicts a process for identifying functions from an address obtained during sampling. The process begins by reading a program counter value that is obtained during sampling of the call stack (step 2400). A determination is made as to whether the end of file has been reached (step 2402). If the end of the file has not been reached, the program counter value is looked up in a global map (step 2404). A global map in the depicted example is a map of system and per process symbols that is generated from system loader information and application, library, and system symbol tables. A process plus function id is obtained from the global map in response to looking up the program counter value (step 2406). Thereafter, the process returns to step 2400.

The function information may be used in generating reports, such as those described below. The process in FIG. 24 also may be used during execution of a program that is sampled.

With reference now to the FIG. 25, a diagram of a structured profile obtained using the processes of the present invention is illustrated. Profile 2500 shows sample numbers in column 2502. Column 2504 shows the call stack with an identification of the functions present within the call stack at different sample times.

With reference now to FIG. 26, a diagram of a record generated using the processes of present invention is depicted. Each routine in record 2600 is listed separately, along with information regarding the routine in FIG. 26. For example, Sample column 2602 identifies the sample number. Next, Calls column 2604 lists the number of times each routine has been called. BASE column 2606 contains the total time spent in the routine, while CUM column 2608 includes the cumulative time spent in the routine and all routines called by the routine. CUM2 2610 is the cumulative time plus time spent in the recursive routines. Name column 2612 contains the name of the routine.

With reference now to FIG. 27, a diagram of another type of report that may be produced is depicted. The report depicted in FIG. 27 illustrates much of the same information found in FIG. 26, but in a slightly different format. As with FIG. 26, diagram 2700 includes information on calls, base time, and cumulative time.

FIG. 27 shows a sample-based trace output containing times spent within various routines as measured in microseconds. FIG. 27 contains one stanza (delimited by rows of equal signs) for each routine that appears in the sample-based trace output. The stanza contains information about the routine itself on the line labeled "Self", about who called it on lines labeled "Parent", and about who the routine called on lines labeled "Child". The stanzas are in order of cum time. The second stanza is about routine A, as indicated by the line beginning with "Self." The numbers on the "Self" line of each stanza show that routine A was called three times in this trace, once by routine C and twice by routine B. In the profile terminology, routines C and B are (immediate) parents of routine A. Routine A is a child of routines C and B. All the numbers on the "Parent" rows of the second stanza are breakdowns of routine A's corresponding numbers. Three microseconds of the seven microsecond total base time spent in A was when it was called by routine C, and three microseconds when it was first called by routine B, and another one microsecond when it was called by routine B for a second time. Likewise, in this example, half of routine A's fourteen microsecond cum time was spent on behalf of each parent.

Routine C called routine B and routine A once each. All the numbers on "Child" rows are subsets of numbers from the child's profile. For example, of the three calls to routine A in this trace, one was by routine C; of routine A's seven microsecond total base time, three microseconds were while it was called directly by routine C; of routine A's fourteen microsecond cum time, seven microseconds was on behalf of routine C. Notice that these same numbers are the first row of the second stanza, where routine C is listed as one of routine A's parents.

The four relationships that are true of each stanza are summarized at the top of FIG. 27. First, the sum of the numbers in the Calls column for parents equals the number of calls on the self row. Second, the sum of the numbers in the Base column for parents equals Self's base. Third, the sum of the numbers in the Cum column for parents equals Self's Cum. These first three invariants are true because these characteristics are the definition of Parent; collectively they are supposed to account for all of Self's activities. Fourth, the Cum in the Child rows accounts for all of Self's Cum except for its own Base.

Program sampling contains information from the call stack and provides a profile, reflecting the sampling of an entire call stack, not just the leaves. Furthermore, the sample-based profiling technique may also be applied to other types of stacks. For example, with Java programs, a large amount of time is spent in a subroutine called the "interpreter". If only the call stack was examined, the profile would not reveal much useful information. Since the interpreter also tracks information in its own stack, e.g., a Java stack (with its own linkage conventions), the process can be used to walk up the Java stack to obtain the calling sequence from the perspective of the interpreted Java program.

As noted previously, both sample-based profiling and event-based profiling have problems. The primary problem related to a sample-based profiling approach, such as using calling sequence stacks, is that it is not always possible to walk calling sequence stacks due to a variety of reasons. First, any routines that have been coded with assembly language code may not follow the normal call/return conventions. Second, the system may support noncontiguous stacks. Third, existing, legacy code may have 16 bit glue code versus more current code with 32 bit glue code. Fourth, the context may change from interpreted Java to C, or from C to Java, with a fairly complex set of return algorithms. This is complicated by calls from Java to native code with a variety of methodologies for calling native code. Fifth, walking the stack may be difficult due to being on the timer tick and being unable to access real memory, i.e. being paged out.

The primary problem related to an event-based profiling approach is that providing event trace records, such as on method entries and method, can generate an amount of data that can be tremendous. Although there are system changes that can be made to instrument the Java code to supply entry/exit hooks, there is no simple way to have entry/exit hooks in all of the non-Java code, including C and assembly language code. In fact, providing a private build with this support has the disadvantage of adding significant overhead related to CPU usage simply to determine if trace data needs to be written, which becomes especially problematic if the hooks are added indiscriminately.

In order to avoid the problems associated with a pure stack-walking-based implementation and a pure method/trace-based implementation and to obtain the advantages of both event-based profiling and sample-based profiling, the present invention provides an integration of both modes of operation. The integration can provide for selectively instrumented stack walks and for timer-based stack walks. The selectively instrumented stack walks are especially useful for debugging and path analysis. The approach in this invention provides for greater flexibility in instrumentation and analysis. Depending on the coverage available in samples, the event data provides contextual information to help resolve the sample data. This is particularly useful in attempting to build a bridge of understanding between Java code and native code. For example, an effective debugging aid is using method entry and exits in conjunction with a stack walking hook placed inside an assembler routine that may be heavily utilized via the non-stack walking profiler.

Figure 28:
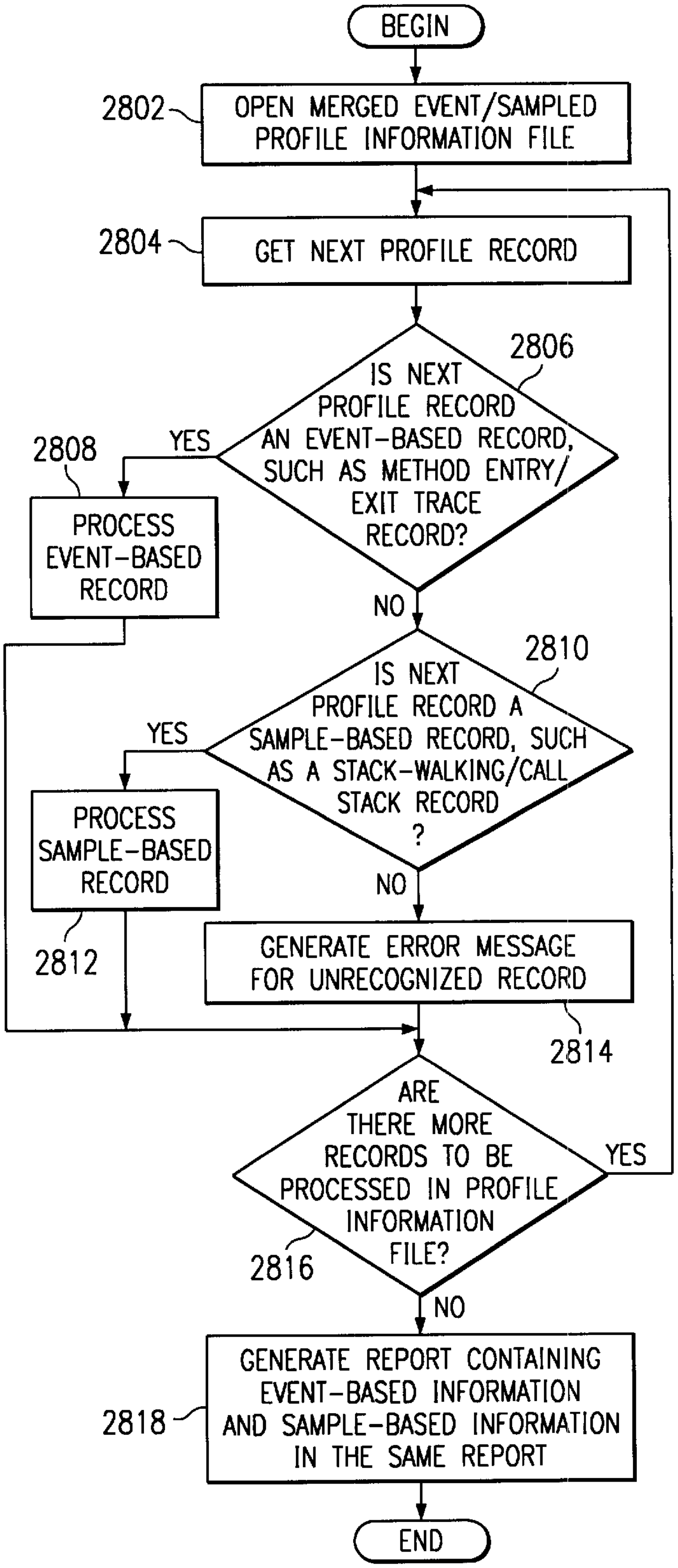
FIG. 28 is a flowchart depicting the processing of a trace file that contains both event-based and sample-based profiling information.

With reference now to FIG. 28, a flowchart depicts the processing of a trace file that contains both event-based and sample-based profiling information. The process shown in FIG. 28 is similar to the overall trace processing shown in FIGS. 5–6 except that the trace file in FIG. 28 has been extended to include sample-based profiling information.

The process begins by opening the trace file that contains event-based profiling information merged with sample-based profiling information (step 2802). A profile record is read from the file (step 2804), and a determination is made as to whether the profile record is an event-based record, such as method entry/exit trace records (step 2806). If so, then the event-based record is processed (step 2808), and a determination is made as to whether they are more records to be processed in the trace file (step 2816). If so, then the process loops back to step 2804. If there are no more records, then a report is generated containing the processed event-based information and the processed sample-based information in the same report (step 2818), and the process terminates.

Referring back to step 2806, if the record that was read from the trace file was not an event-based record, then a determination is made as to whether the record is a sample-based record, such as a stack-walking or call stack unwind record (step 2810). If so, then the sample-based record is processed (step 2812), and the process continues by checking for remaining records in step 2816. If the next record was not a sample-based record, then an error message is generated for the unrecognized record as the trace file is assumed to contain one of the two type of profiling records, either event-based profiling records or sample-based profiling records.

With reference now to FIG. 29, a figure depicts a report generated from a trace file containing both event-based profiling information (method entry/exits) and sample-based profiling information (stack unwind). FIG. 29 is similar to FIG. 20, in which a call stack tree is presented as a report, except that FIG. 29 contains embedded stack walking information. Call stack tree 2900 contains two stack unwinds generated within the time period represented by the total of 342 ticks. Stack unwind identifier 2902 denotes the beginning of stack unwind information 2906, with the names of routines that are indented to the right containing the stack information that the stack walking process was able to discern. Stack unwind identifier 2904 denotes the beginning of stack unwind information 2908. In this example, "I:" identifies an interpreted method and "F:" identifies a native function, such as a native function within JavaOS. A call from a Java method to a native method is via "ExecuteJava." Hence, at the point at which the stack walking process reaches a stack frame for an "ExecuteJava," it cannot proceed any further up the stack as the stack frames are discontinued. The process for creating a tree containing both event-based nodes and sample-based nodes is described in more detail further below. In this case, identifiers 2902 and 2904 also denote the major code associated with the stack unwind. Major codes are described in further detail below.

With reference now to FIG. 30, a table depicts major codes and minor codes that may be employed to instrument software modules for profiling. In order to facilitate the merging of event-based profiling information and sample-based profiling information, a set of codes may be used to turn on and off various types of profiling functions.

For example, as shown in FIG. 30, the minor code for a stack unwind is designated as 0×7fffffff, which may be used for two different purposes. The first purpose, denoted with a major code of 0×40, is for a stack unwind during a timer interrupt. When this information is output into a trace file, the stack information that appears within the file will have been coded so that the stack information is analyzed as sample-based profiling information. The second purpose, denoted with a major code of 0×41, is for a stack unwind in an instrumented routine. This stack information could then be post-processed as event-based profiling information.

Other examples in the table show a profile or major code purpose of tracing jitted methods with a major code value of 0×50. Tracing of jitted methods may be distinguished based on the minor code that indicates method invocation or method exit. In contrast, a major code of 0×30 indicates a profiling purpose of instrumenting interpreted methods, while the minor code again indicates, with the same values, method invocation or method exit.

Referring back to FIG. 29, the connection can be made between the use of major and minor codes, the instrumentation of code, and the post-processing of profile information. In the generated report shown in FIG. 29, the stack unwind identifiers can be seen to be equal to 0×40, which according to the table in FIG. 30, is a stack unwind generated in response to a timer interrupt. This type of stack unwind may have occurred in response to a regular interrupt that was created in order to generate a sampled profile of the executing software.

As noted in the last column of the table in FIG. 30, by using a utility that places a hook into a software module to be profiled, a stack unwind may be instrumented into a routine. If so, the output for this type of stack unwind will be designated with a major code of 0×41.

Figure 31A:
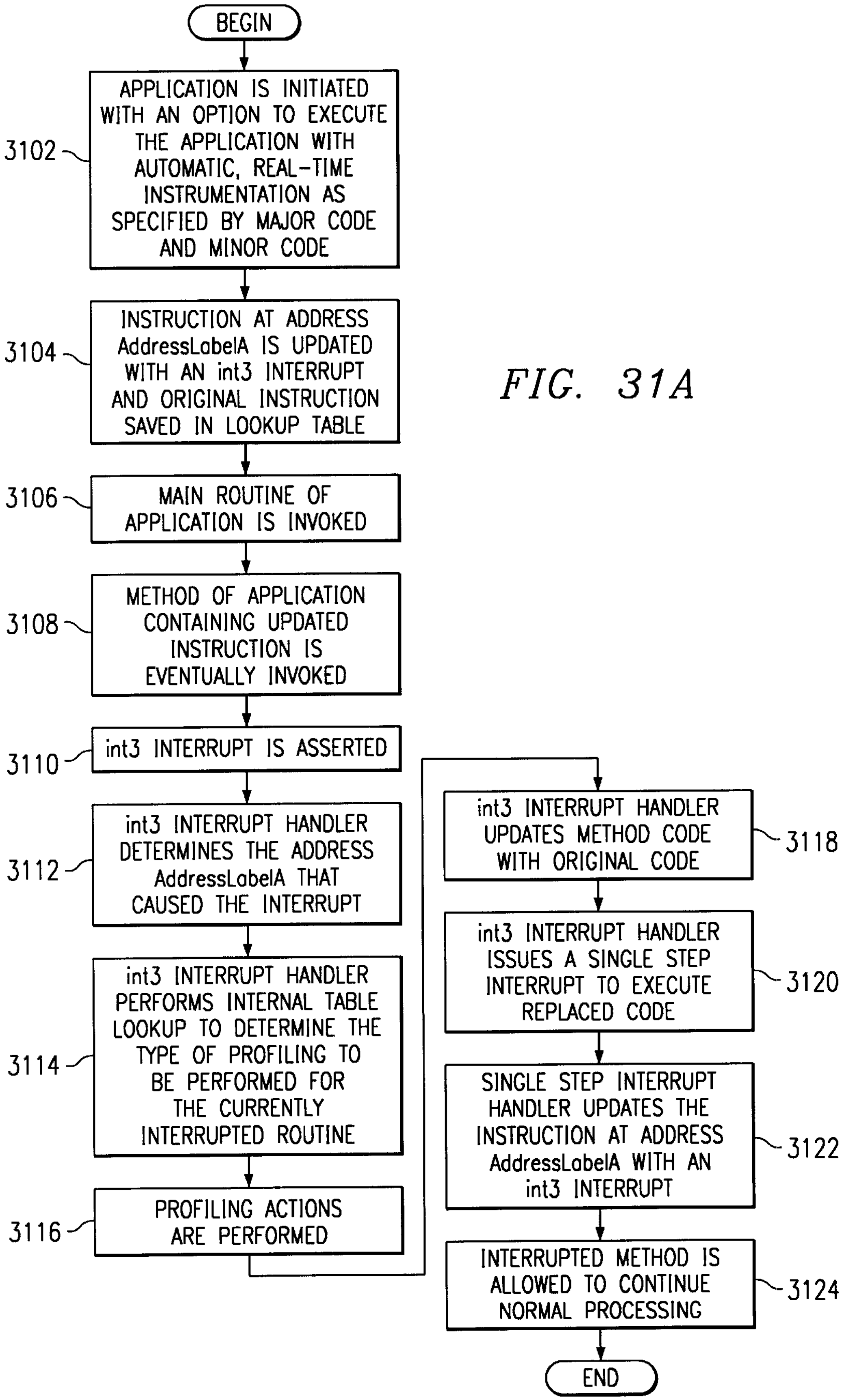
FIG. 31A is a flowchart depicting a process for inserting profile hooks into specific routines in real-time by updating the code for a software interrupt.

With reference now to FIG. 31A, a flowchart depicts a process for inserting profile hooks into specific routines in real-time by updating the code for a software interrupt. However, when the interrupt is fielded, it may be used to generate a variety of profiling information, such as stack unwind information. The type of profiling information that is to be generated may be determined based upon a preselected major code and minor code that have been used to instrument the software.

The process begins when an application is initiated with an option to execute the application with automatic, real-time instrumentation as specified by a major code and minor code (step 3102). Using the map of a dynamic load library (DLL), one can determine the start of a routine to be instrumented. A utility takes, as input, the memory map, the name of the routine to be patched or updated, and the profiling function that is desired. The utility either patches the file corresponding to the map name on disk or its loaded version.

An instruction at a memory address AddressLabelA, usually the start of the routine, is updated with an int3 interrupt, and the original instruction is saved in a lookup table (step 3104). The utility remembers the byte that is replaced with the int3 interrupt and its location within the file or within memory. The utility then takes over the software interrupt vector and allows execution to continue. For example, if the application is being loaded, the main routine of the application may be invoked (step 3106).

The method in the application that contains the updated instruction is eventually invoked (step 3108), and the int3 interrupt is asserted (step 3110). The int3 interrupt handler then determines that the address AddressLabelA has caused the interrupt (step 3112) by using the program counter. The int3 interrupt handler determines that the interrupt was caused by a real-time insertion of an interrupt and performs an internal table lookup to determine the type of profiling to be performed for the currently interrupted routine (step 3114). Profiling actions are then performed (step 3116). For example, if the table indicated a stack unwind as the desired type of profiling, then the stack walking process is invoked, which will identify the interrupted routine as the first entry in the stack.

The int3 interrupt handler then updates the method code with the original code (step 3118) and issues a single step interrupt to execute the original or replaced code (step 3120). Similar to the fielding of the int3 interrupt, a utility may take over the single step interrupt vector and field the interrupt. At the point that the single step interrupt is fielded, the routine has been executed in single step mode. The interrupt handler then updates the instruction at address AddressLabelA by inserting the int3 interrupt again (step 3122), and the interrupted method is allowed to continue normally (step 3124).

With reference now to FIGS. 31B–C, examples of pseudo-assembly language code depict the changes required for inserting profile hooks into specific routines in real-time by updating the code for a software interrupt. FIG. 31B shows a set of generic instructions before alteration. As noted previously, these types of hooks are generally placed at the beginning of a routine, but for illustration in FIG. 31C, an int3 interrupt is shown being embedded within a routine.

With this methodology, the stack unwind may occur at selected points in the code without actually modifying the source code. The same approach may be used with jitted code if the utility has access to all of the hooks which identify the placement of the jitted code.

FIGS. 31A–C describes a manner in which a module may be instrumented in real-time with profiling hooks, and these hooks may use the major code and minor code distinctions as explained with respect to FIG. 30. An example of a report that shows calling structure between routines is shown in FIG. 29, which also showed the use of a major code in distinguishing some of the trace information. However, the manner in which the report was generated, i.e. the manner which the event-based profiling information and sample-based profiling information may be merged into a single data structure, is described with respect to FIGS. 32A–33.

With respect to FIGS. 32A–32C, a series of tree structures generated from events and stack unwinds is depicted.

A stack unwind may assume that the type of routines that will appear within a stack adhere to a common type of routine-calling methodology. The types of routines that one would expect to find in a stack unwind include jitted methods or native methods, which would typically appear in the event trace output via the entry/exit tracing. However, there may be some routines in a list of routines gathered from a stack unwind that do not appear in a list of routines gathered from an event trace. With the exception of interpreted code, one would not expect to have any routines in an event-based tree structure gathered from trace records that are not found in the call stack tree structure. One might only expect a one-to-one correspondence between the stack unwinds and method entry/exits if every method were instrumented with an entry and exit hook. Hence, the problem of matching routines from event records and routines from stack walking records is reduced to the problem of merging a stack unwind that contains every routine that might appear in the method entries/exits.

FIGS. 32A–32B provide an example of the discrepancies that may be found between a stack unwind or entry/exit trace records. FIG. 32A contains each routine that may be found in FIG. 32B. According to tree 3200, routine Event1 has called routine Event2. According to tree 3210, routine Event1 has called routine SampleA, which has called routine SampleB, which has called routine Event2, which has called routine SampleC, which called SampleD, which called SampleE. These trees are similar to the type of trees shown in FIGS. 19A–19B and built according to methods described in FIGS. 21–23. In order to provide an integrated report of event and sampled data that shows calling structure, as shown in FIG. 29, the two sets of information shown in FIG. 32A and FIG. 32B must be merged.

Rather than inserting the sampled nodes between two event nodes, a sampled sequence is chained or connected to an event node. FIG. 32C shows tree 3220 in which the sampled nodes SampleC, SampleD, and SampleE have been connected to event node Event2 and in which the sampled nodes SampleA and SampleB have been connected to event node Event1. In this manner, the original calling sequence configuration according to the event trace records is preserved while the sample-derived calling sequence is appended to provide more information about the sequence of calls than could be provided by the event-based tree alone. The process of building the merged tree is described further below.

Referring back to FIG. 19A, the data structure for each node in the tree is shown. In order to support the merged tree shown in FIG. 32C, the data structure for each node may be updated so that it includes a flag or other type of indicator identifying the node as a sampled node and providing a variable for the storage of the number of sampled occurrences, i.e. the number of times that the call stack configuration from a stack unwind within the trace output matched the configuration as represented by a particular node in the tree.

With reference now to FIG. 33, a flowchart depicts a method by which a tree containing merged sample data and event data is constructed. The algorithms discussed above for creating event-based tree remains unchanged but sample-based processing proceeds as shown in FIG. 33.

The process begins by converting the sampled call stack into an sampled call stack array of routine names (step 3302) in which the first entry is the interrupted routine and the last entry is the initial routine or as close to the "root caller" as is available. The conversion of memory address into routine names is described above. An entry from the array of names is retrieved (step 3304), and a search is made for the name occurs in the current event stack tree (step 3306). Once the name occurs in the event stack tree, a set of "sampled nodes" consisting of a subtree is connected to the event-based tree (step 3308), and the new subtree represents the entries in the sampled call stack array up to the presently matching node. A determination is then made as to whether there are other entries in the sampled call stack array that have yet to be processed (step 3310). If so, then the process loops back to process another entry for a match in the event tree. If not, then the process completes. When a sampled call stack array entry is connected or chained to a node in an event tree, the sampled node flags and other associated information in the node, as described above, are updated.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, the present invention may be applied to other interpreted programming systems and environments other than Java. The embodiment was chosen and described in order to best explain the principles of the invention the practical application and to enable others of ordinary skill in the art to understand the invention for various embodiments with various modifications as are suited to the particular use contemplated.

It is important to note that while the present invention has been described in the context of a single JVM active in an operating system, there is no constraint to its application to multiple JVMs. This generalization is well within the means of those with ordinary skill in the art.

What is claimed is:

1. A process in a data processing system for profiling an instrumented program executing in the data processing system, the process comprising:

recording trace data in response to an occurrence of a selected event within the instrumented program;

detecting an occurrence of a selected interrupt;

identifying a call stack associated with the instrumented program in response to the detection of the selected interrupt;

examining the call stack to identify each routine that is currently executing in association with the instrumented program; and recording additional trace data which includes an indication of each currently executing routine.

2. The process of claim 1 further comprising: processing the trace data to identify a thread and method executed for each indication.

3. The process of claim 2 wherein the step of processing the trace data comprises identifying trace data in real-time as it is recorded during execution of the instrumented program.

4. The process of claim 2 wherein the step of processing the trace data comprises identifying trace data obtained from a trace file containing one or more trace events stored in the trace file.

5. The process of claim 1 further comprising:

generating trace data based on a major code and a minor code, wherein the major code and the minor code provide selection of profiling functions.

6. The process of claim 5 wherein the major code and the minor code select a call stack unwind profiling function to be executed in response to the occurrence of the selected interrupt.

7. The process of claim 5 wherein the major code and the minor code select a call stack unwind profiling function to be executed in response to the occurrence of the selected event within the instrumented program.

8. The process of claim 1 further comprising:

instrumenting the program with a real-time insertion of an interrupt instruction into the instrumented program for generating an interrupt.

9. The process of claim 8 further comprising:

reading an original instruction at an address in the program;

storing the original instruction in a lookup table with the address and an associated profiling function;

replacing the original instruction with the interrupt instruction;

fielding an interrupt generated by the interrupt instruction at the address;

searching the lookup table using the address; and performing the associated profiling function.

10. The process of claim 9 further comprising:

restoring the original instruction at the address;

issuing a single step interrupt to execute the original instruction; and restoring the interrupt instruction at the address.

11. An apparatus for profiling an instrumented program executing in a data processing system, the apparatus comprising:

first recording means for recording trace data in response to an occurrence of a selected event within the instrumented program;

detecting means for detecting an occurrence of a selected interrupt;

identifying means for identifying a call stack associated with the instrumented program in response to the detection of the selected interrupt;

examining means for examining the call stack to identify each routine that is currently executing in association with the instrumented program; and second recording means for recording additional trace data which includes an indication of each currently executing routine.

12. The apparatus of claim 11 further comprising:

processing means for processing the trace data to identify a thread and method executed for each indication.

13. The apparatus of claim 12 wherein the processing means comprises identifying means for identifying trace data in real-time as it is recorded during execution of the instrumented program.

14. The apparatus of claim 12 wherein the processing means comprises identifying means for identifying trace data obtained from a trace file containing one or more trace events stored in the trace file.

15. The apparatus of claim 11 further comprising:

generating means for generating trace data based on a major code and a minor code, wherein the major code and the minor code provide selection of profiling functions.

16. The apparatus of claim 15 wherein the major code and the minor code select a call stack unwind profiling function to be executed in response to the occurrence of the selected interrupt.

17. The apparatus of claim 15 wherein the major code and the minor code select a call stack unwind profiling function to be executed in response to the occurrence of the selected event within the instrumented program.

18. The apparatus of claim 11 further comprising:

instrumenting means for instrumenting the program with a real-time insertion of an interrupt instruction into the program for generating an interrupt.

19. The apparatus of claim 18 further comprising:

reading means for reading an original instruction at an address in the program;

storing means for storing the original instruction in a lookup table with the address and an associated profiling function;

replacing means for replacing the original instruction with the interrupt instruction;

fielding means for fielding an interrupt generated by the interrupt instruction at the address;

searching means for searching the lookup table using the address; and performing means for performing the associated profiling function.

20. The apparatus of claim 19 further comprising:

first restoring means for restoring the original instruction at the address;

issuing means for issuing a single step interrupt to execute the original instruction; and second restoring means for restoring the interrupt instruction at the address.

21. A computer program product on a computer readable medium for use in a data processing system for profiling an executing program, the computer program product comprising:

first instructions for recording trace data in response to an occurrence of a selected event within the instrumented program;

second instructions for detecting an occurrence of a selected interrupt;

third instructions for identifying a call stack associated with the instrumented program in response to the detection of the selected interrupt;

fourth instructions for examining the call stack to identify each routine that is currently executing in association with the instrumented program; and fifth instructions for recording additional trace data which includes an indication of each currently executing routine.

22. The computer program product of claim 21 further comprising:

instructions for processing the trace data to identify a thread and method executed for each indication.

23. The computer program product of claim 22 wherein the instructions for processing comprises instructions for identifying trace data in real-time as it is recorded during execution of the instrumented program.

24. The computer program product of claim 22 wherein the instructions for processing comprises instructions for identifying trace data obtained from a trace file containing one or more trace events stored in the trace file.

25. The computer program product of claim 21 further comprising:

instructions for generating trace data based on a major code and a minor code, wherein the major code and the minor code provide selection of profiling functions.

26. The computer program product of claim 25 wherein the major code and the minor code select a call stack unwind profiling function to be executed in response to the occurrence of the selected interrupt.

27. The computer program product of claim 25 wherein the major code and the minor code select a call stack unwind profiling function to be executed in response to the occurrence of the selected event within the instrumented program.

28. The computer program product of claim 21 further comprising:

instructions for instrumenting the program with a real-time insertion of an interrupt instruction into the instrumented program for generating an interrupt.

29. The computer program product of claim 28 further comprising:

instructions for reading an original instruction at an address in the program;

instructions for storing the original instruction in a lookup table with the address and an associated profiling function;

instructions for replacing the original instruction with the interrupt instruction;

instructions for fielding an interrupt generated by the interrupt instruction at the address;

instructions for searching the lookup table using the address; and instructions for performing the associated profiling function.

30. The computer program product of claim 29 further comprising:

instructions for restoring the original instruction at the address;

instructions for issuing a single step interrupt to execute the original instruction; and instructions for restoring the interrupt instruction at the address.

31. A data processing system comprising:

a bus system;

a communications unit connected to the bus system;.

a memory connected to the bus system, wherein the memory includes a set of instructions; and a processing unit connected to the bus system, wherein the processing unit executes the set of instructions to record trace data in response to an occurrence of a selected event within an instrumented program; detect an occurrence of a selected interrupt; identify a call stack associated with the program in response to the detection of the selected interrupt; examine the call stack to identify each routine that is currently executing in association with the program; and record additional trace data which includes an indication of each currently executing routine.

* * * * *